United States Patent
Nakatsu et al.

(10) Patent No.: US 8,954,249 B2
(45) Date of Patent: Feb. 10, 2015

(54) BRAKING FORCE CONTROL APPARATUS FOR VEHICLE

(75) Inventors: Masatoshi Nakatsu, Susono (JP); Fumito Kurata, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/147,509

(22) PCT Filed: Aug. 30, 2010

(86) PCT No.: PCT/JP2010/064684
§ 371 (c)(1),
(2), (4) Date: Aug. 2, 2011

(87) PCT Pub. No.: WO2012/029100
PCT Pub. Date: Mar. 8, 2012

(65) Prior Publication Data
US 2013/0173127 A1    Jul. 4, 2013

(51) Int. Cl.
*G06F 7/00*       (2006.01)
*B60B 39/00*     (2006.01)
(Continued)

(52) U.S. Cl.
CPC ............... *B60T 8/1763* (2013.01); *B60L 3/102* (2013.01); *B60L 3/108* (2013.01); *B60L 7/14* (2013.01);
(Continued)

(58) Field of Classification Search
CPC ............ B60L 3/102; B60L 7/14; B60L 7/26; B60L 11/1803; B60L 15/2009; B60L 3/108; B60T 1/10; B60T 8/1763; B60T 8/172; B60W 10/08; B60W 10/184; B60W 30/18127

USPC .................................................. 701/96, 69–73
See application file for complete search history.

(56) References Cited

U.S. PATENT DOCUMENTS

2006/0220453 A1 * 10/2006 Saito et al. ...................... 303/152
2007/0018499 A1    1/2007 Kokubo et al.
(Continued)

FOREIGN PATENT DOCUMENTS

CN              1911706 A      2/2007
DE    10 2008 001 973 A1   12/2009
(Continued)

OTHER PUBLICATIONS

International Search Report dated Nov. 22, 2010 in International Application No. PCT/JP2010/064684 (with translation).
(Continued)

Primary Examiner — Helal A Algahaim
Assistant Examiner — Nga X Nguyen
(74) Attorney, Agent, or Firm — Oliff PLC

(57) ABSTRACT

A braking force control apparatus for a vehicle estimates the friction coefficient $\mu$ of a road surface as the state of the road surface on which the vehicle travels, and determines an ideal braking force $\mu W$ by making use of the estimated road surface friction coefficient $\mu$. When $\mu$ is equal to or greater than a predetermined friction coefficient $\mu 0$, the braking force control apparatus operates an in-wheel motor in a regeneration state to generate a motor braking torque Tmr, and causes a friction brake mechanism to generate a frictional braking force Bf computed by subtracting Tmr from $\mu W$. When $\mu$ is less than $\mu 0$, the braking force control apparatus operates the in-wheel motor in a power running state to generate a motor driving torque Tmc, and causes the friction brake mechanism to generate a Bf computed by adding Tmc to $\mu W$.

10 Claims, 16 Drawing Sheets

(51) Int. Cl.

| | | |
|---|---|---|
| *B60T 8/1763* | (2006.01) | |
| *B60L 3/10* | (2006.01) | |
| *B60L 7/14* | (2006.01) | |
| *B60L 7/26* | (2006.01) | |
| *B60L 11/18* | (2006.01) | |
| *B60T 1/10* | (2006.01) | |
| *B60L 15/20* | (2006.01) | |
| *B60T 8/172* | (2006.01) | |
| *B60W 30/18* | (2012.01) | |
| *B60W 10/08* | (2006.01) | |
| *B60W 10/184* | (2012.01) | |

(52) U.S. Cl.
CPC ............... *B60L 7/26* (2013.01); *B60L 11/1803* (2013.01); *B60T 1/10* (2013.01); *B60L 15/2009* (2013.01); *B60T 8/172* (2013.01); *B60W 30/18127* (2013.01); *B60W 10/08* (2013.01); *B60W 10/184* (2013.01); *B60L 2220/14* (2013.01); *B60L 2220/44* (2013.01); *B60L 2240/423* (2013.01); *B60L 2240/461* (2013.01); *B60L 2260/28* (2013.01); *B60T 2270/604* (2013.01); *Y02T 10/642* (2013.01); *Y02T 10/7005* (2013.01); *Y02T 10/70* (2013.01); *B60T 2210/124* (2013.01); *B60W 2540/12* (2013.01); *B60W 2550/148* (2013.01); *B60W 2720/30* (2013.01); *B60Y 2300/89* (2013.01)

USPC .................................. 701/70; 701/69; 701/71

(56) References Cited

U.S. PATENT DOCUMENTS

| | | |
|---|---|---|
| 2007/0038340 A1 | 2/2007 | Sekiguchi et al. |
| 2009/0248269 A1* | 10/2009 | Yasui et al. ...................... 701/74 |
| 2010/0127562 A1* | 5/2010 | Yokoyama et al. ........... 303/151 |
| 2011/0125354 A1 | 5/2011 | Gottwick |

FOREIGN PATENT DOCUMENTS

| | | |
|---|---|---|
| EP | 2 127 974 A1 | 12/2009 |
| JP | A-5-270387 | 10/1993 |
| JP | A-8-98313 | 4/1996 |
| JP | A-10-297462 | 11/1998 |
| JP | A-2001-97204 | 4/2001 |
| JP | A-2005-210798 | 8/2005 |
| JP | A-2008-148534 | 6/2008 |
| JP | A-2009-273275 | 11/2009 |

OTHER PUBLICATIONS

May 9, 2014 Extended Search Report issued in European Application No. 10 84 1807.

* cited by examiner

FIG.6
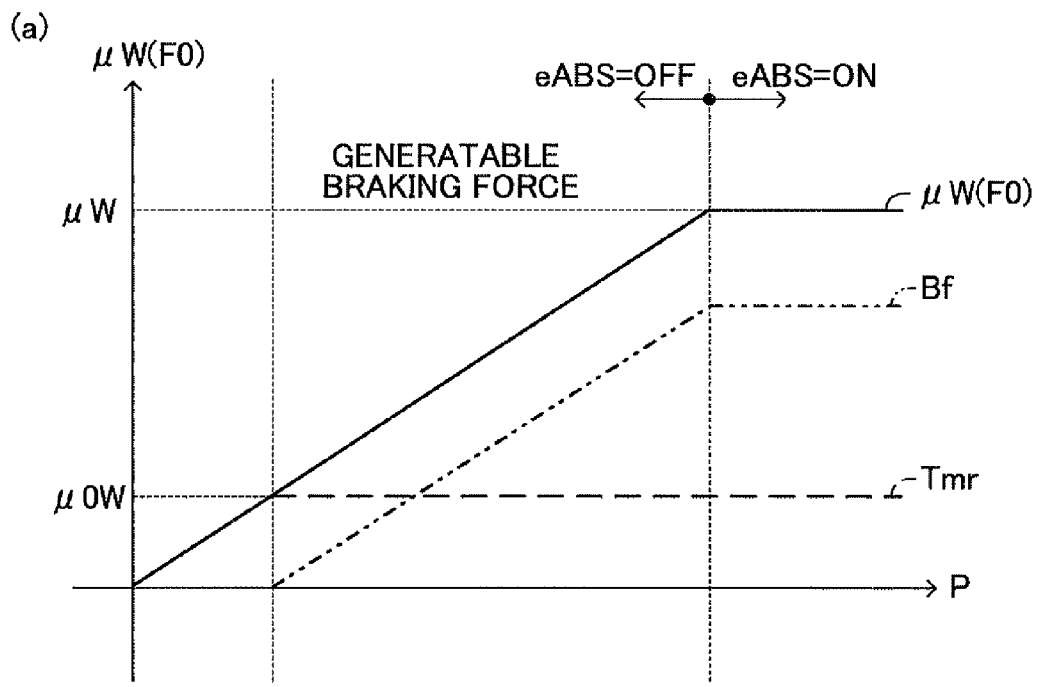
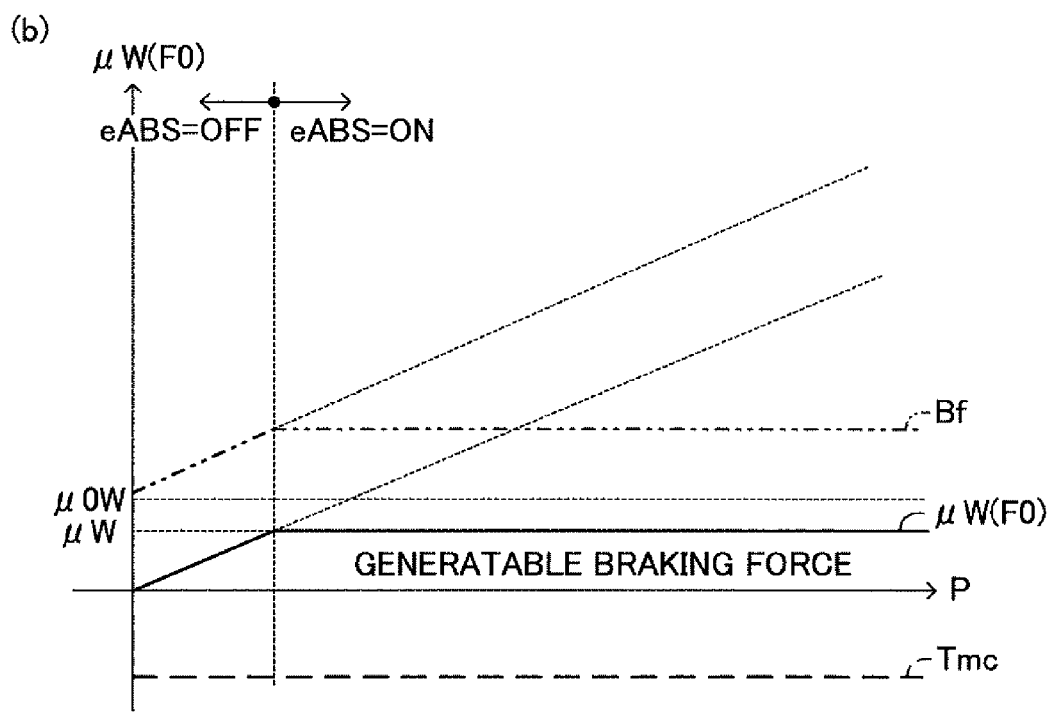

FIG.10
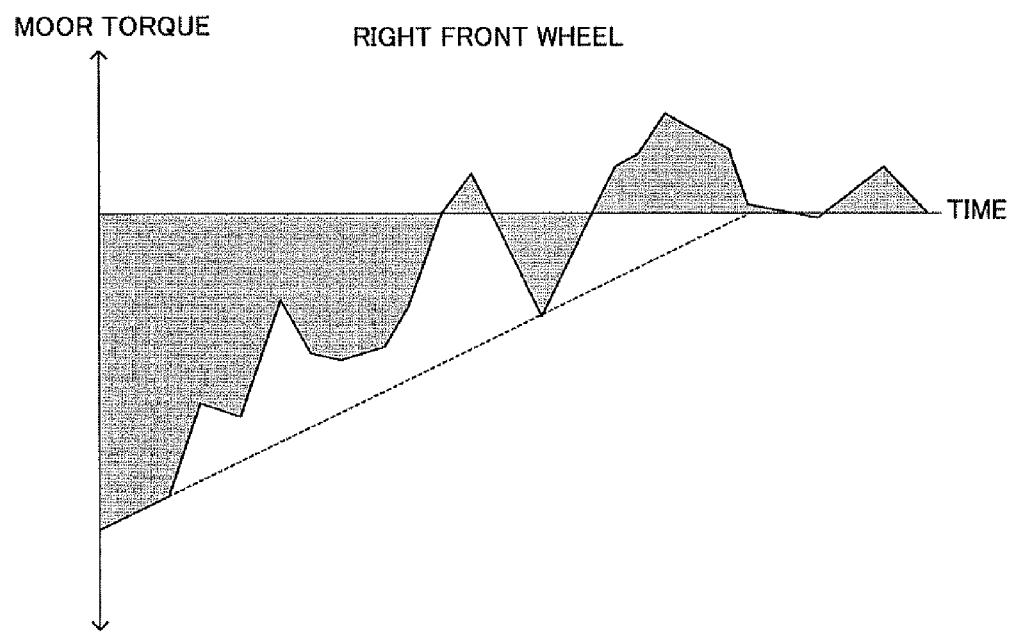
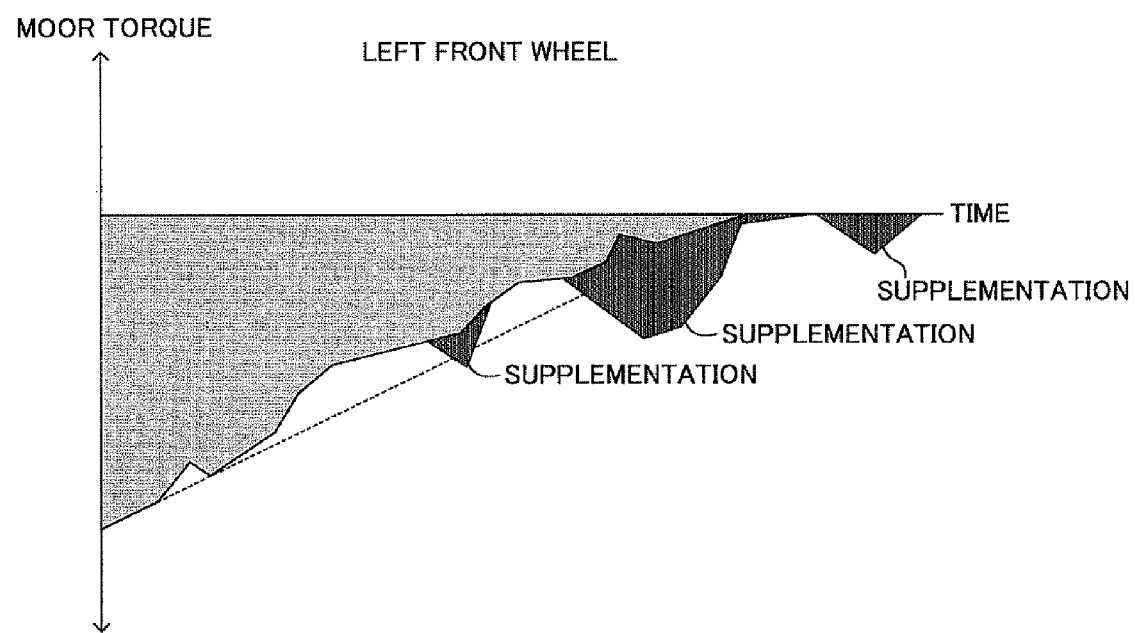

BRAKING FORCE CONTROL APPARATUS FOR VEHICLE

TECHNICAL FIELD

The present invention relates to a braking force control apparatus for a vehicle which controls braking force of the vehicle, and more particularly to a braking force control apparatus for a vehicle which properly avoids locking of wheels during braking.

BACKGROUND ART

Conventionally, a braking control apparatus for an electric vehicle as disclosed in Japanese Patent Application Laid-Open (kokai) No. H5-270387 is known. This conventional braking control apparatus for an electric vehicle is configured such that, during execution of ABS control, it controls the torque of a drive motor from a range for a regeneration mode to a range for a power running mode, while maintaining a hydraulic braking force command value at the same value as the previous hydraulic braking force command value; i.e., maintaining a constant mechanical braking force.

Conventionally, a braking force control apparatus as disclosed in Japanese Patent Application Laid-Open (kokai) No. H10-297462 is also known. This conventional braking force control apparatus is configured such that, during execution of ABS control, it reduces both hydraulic braking force and regenerative braking force when a slip ratio exceeds a threshold value, and gradually increases the hydraulic braking force, while maintaining the regenerative braking force at a constant level, when the slip ratio becomes lower than the threshold value. In this conventional braking force control apparatus, when the regenerative braking force decreases to zero, the regenerative braking force is prevented from decreasing further, whereby the regenerative braking force is prevented from assuming a negative value; that is, generation of driving force during braking operation is prevented.

Conventionally, a braking force control apparatus for an automobile as disclosed in Japanese Patent Application Laid-Open (kokai) No. 2001-97204 is also known. This conventional braking force control apparatus for an automobile is configured to perform feedback control such that a slip ratio of each wheel coincides with a target slip ratio, calculate a motor torque command value so as to control the braking/driving torque of a motor, and set a motor torque target value for securing positive and negative motor torque control ranges. This conventional braking force control apparatus for an automobile is configured such that, after having determined to perform ABS control, it performs feedback control such that the detected motor torque coincides with a target motor torque, and calculates a frictional braking torque command value so as to control the frictional braking torque of a mechanical brake.

Conventionally, a driving force control apparatus for a vehicle and a driving force control method for a vehicle as disclosed in Japanese Patent Application Laid-Open (kokai) No. 2005-210798 are also known. In the conventional driving force control apparatus for a vehicle and the conventional driving force control method for a vehicle, during preparation for collision avoidance operation or preparation for ending of the collision avoidance operation, the magnitude of torque of each electric motor is compared with a preload torque. In the case where the magnitude of the torque of the electric motor has not yet reached the preload torque, the torques of the electric motors for driving front and rear wheels are determined such that the torque of the electric motor for driving the front wheels and the torque of the electric motor for driving the rear wheels reach the preload torque and such that the electric motor for driving the rear wheels is operated in a power running mode so as to cancel out a force generated by operating, in a regeneration mode, the electric motor for driving the front wheels.

Conventionally, a control apparatus for a vehicle as disclosed in Japanese Patent Application Laid-Open (kokai) No. 2009-273275 is also known. This conventional control apparatus for a vehicle is configured such that, in the case where a driving force or braking force which is applied to front or rear wheels on the basis of a driving force distribution ratio calculated so as to restrain pitching or bouncing of the vehicle body assumes a value close to zero, the apparatus controls a friction brake mechanism so as to apply predetermined braking forces to the front or rear wheels, and applies to the front or rear wheels driving forces for canceling out the predetermined braking forces.

Conventionally, a braking apparatus for an electric vehicle as disclosed in Japanese Patent Application Laid-Open (kokai) No. H8-98313 is also known. This conventional braking apparatus for an electric vehicle is configured such that, upon switching from a regenerative braking mode to an ABS mode, the apparatus reduces the amount of electric power regenerated through regenerative braking, and performs changeover from regenerative braking to hydraulic braking.

SUMMARY OF THE INVENTION

Problems to be Solved by the Invention

Incidentally, the conventional braking control apparatus for an electric vehicle disclosed in Japanese Patent Application Laid-Open (kokai) No. H5-270387 and the braking force control apparatus for an automobile disclosed in Japanese Patent Application Laid-Open (kokai) No. 2001-97204, during ABS control, a drive motor is operated through regeneration control and power running control so as to increase and decrease torque (that is, generate torque in forward and backward directions). In general, a power transmission system (e.g., a reduction gear or the like) provided between a motor and a wheel typically has a backlash. Therefore, when the direction of torque generated by the motor is reversed as a result of switching between the regeneration control and the power running control, a time lag may arise in control, resulting in a possible failure in obtaining a satisfactory control performance. Moreover, in the case where the drive motor is operated through the regeneration control and the power running control, the backlash of the power transmission system is likely to generate noise, to thereby impart an unnatural sensation to a driver.

The present invention has been accomplished to solve the problem mentioned above, and its object is to provide a braking force control apparatus for a vehicle which avoids locking of wheels during braking with high responsiveness and which properly brakes the vehicle.

Means for Solving the Problems

In order to achieve the above-described object, the present invention provides a braking force control apparatus for a vehicle which comprises an electrical force generation mechanism which applies electromagnetic driving force or electromagnetic braking force to a wheel of the vehicle; a braking force generation mechanism which applies mechanical braking force at least to the wheel which is rotated by the electromagnetic driving force generated by the electrical force generation mechanism; brake operation means which is operated by a driver in order to brake the vehicle; braking control means for controlling, in accordance with the operation of the brake operation means, the electromagnetic braking force or the electromagnetic driving force generated by the electrical force generation mechanism and the mechanical braking force generated by the braking force generation mechanism such that a braking force is applied to the wheel, the braking force control apparatus being characterized in that the braking control means comprises road surface state detection means for detecting the state of a road surface on which the vehicle travels; lock tendency determination means for determining whether or not the wheel tends to lock on the basis of the state of the road surface detected by the road surface state detection means; target braking force determination means for determining a target braking force to be applied to the wheel, in accordance with the state of the road surface detected by the road surface state detection means; electrical force generation mechanism operation means, operable when the lock tendency determination means determines that the wheel tends to lock, for operating the electrical force generation mechanism in a power running state or a regeneration state to thereby generate an electromagnetic driving force of a predetermined magnitude or an electromagnetic braking force of a predetermined magnitude; braking force computation means for computing a mechanical braking force to be generated by the braking force generation mechanism, the mechanical braking force corresponding to a difference between the target braking force determined by the target braking force determination means and the electromagnetic braking force or the electromagnetic driving force generated by the electrical force generation mechanism operated by the electrical force generation mechanism operation means; and braking force generation mechanism operation means for operating the braking force generation mechanism on the basis of the mechanical braking force computed by the braking force computation means.

In this case, preferably, the road surface state detection means is composed of slip ratio estimation means for estimating a slip ratio of the wheel, and road surface friction coefficient estimation means for estimating a friction coefficient of the road surface on which the vehicle travels, on basis of the slip ratio estimated by the slip ratio estimation means; the lock tendency determination means determines whether or not the wheel tends to lock on the basis of the slip ratio estimated by the slip ratio estimation means; and the target braking force determination means determines the target braking force by calculating it by making use of the friction coefficient of the road surface estimated by the road surface friction coefficient estimation means.

By virtue of these configurations, the road surface state detection means can detect the state of the road surface by estimating the slip ratio and the road surface friction coefficient, and the lock tendency determination means can determine whether or not the wheel of the vehicle tends to lock on the basis of the estimated slip ratio. Also, the target braking force determination means can determine a target braking force to be applied to the wheel by computing it by making use of the estimated friction coefficient of the road surface.

When the lock tendency determination means determines that the wheel tends to lock, the electrical force generation mechanism operation means can operate the electrical force generation mechanism in the power running state only, to thereby cause the electrical force generation mechanism to generate an electromagnetic driving force of a predetermined magnitude, or operate the electrical force generation mechanism in the regeneration state only, to thereby cause the electrical force generation mechanism to generate an electromagnetic braking force of a predetermined magnitude. That is, when the wheel tends to lock, the electrical force generation mechanism operation means can maintain one of the operation of the electrical force generation mechanism in the power running state and the operation of the electrical force generation mechanism in the regeneration state.

Thus, there is not produced an alternating state in which, in order to avoid locking of the wheel, the electrical force generation mechanism is repeatedly and alternately in the power running state and the regeneration state; in other words, generation of an electromagnetic driving force through power running and generation of an electromagnetic braking force through regeneration are repeatedly and alternately performed. Therefore, even in the case where a power transmission system (e.g., a reduction gear or the like) of the electrical force generation mechanism which transmits power to the wheel has backlash, a time delay in control, which is produced due to presence of the backlash, is not produced, because force is transmitted only in one direction in which the driving force or the braking force is transmitted. Therefore, satisfactory responsiveness can be secured, and control for avoiding locking of the wheel can be performed more precisely. In addition, since force is transmitted only in one direction in which driving force or braking force is transmitted, for example, it is possible to prevent generation of noise stemming from the backlash, and effectively prevent impartment of unnatural sensation to the driver.

Moreover, when the electrical force generation mechanism operation means operates the electrical force generation mechanism in the power running state or the regeneration state, the braking force computation means can compute the mechanical braking force to be generated by the braking force generation mechanism, the mechanical braking force corresponding to the difference between the target braking force determined by the target braking force determination means and the electromagnetic braking force or the electromagnetic driving force generated by the electrical force generation mechanism. By virtue of this, in a situation where the electrical force generation mechanism operation means operates the electrical force generation mechanism in the power running state or the regeneration state, the braking force generation mechanism can always apply to the wheel a mechanical braking force of a proper magnitude.

Therefore, even in the case where the electrical force generation mechanism generates an electromagnetic driving force of a predetermined magnitude in the power running state, the target braking force can be generated at all times through application of a mechanical braking force to the wheel, and the braking force generation mechanism can always apply a mechanical braking force of a proper magnitude to the wheel. Therefore, even in the case where the operation of the electrical force generation mechanism becomes anomalous, and the electrical force generation mechanism is stopped, the vehicle can be braked without production of any response delay.

In this case, preferably, the electrical force generation mechanism operation means operates the electrical force generation mechanism in the power running state or the regeneration state in accordance with the magnitude of the friction coefficient of the road surface estimated by the road surface friction coefficient estimation means, to thereby generate the electromagnetic driving force of the predetermined magnitude or the electromagnetic braking force of the predetermined magnitude. In this case, more specifically, the electrical force generation mechanism operation means operates the electrical force generation mechanism in the power running state to thereby generate the electromagnetic driving force of the predetermined magnitude when the magnitude of the friction coefficient of the road surface estimated by the road surface friction coefficient estimation means is less than the magnitude of a predetermined friction coefficient; and the electrical force generation mechanism operation means operates the electrical force generation mechanism in the regeneration state to thereby generate the electromagnetic braking force of the predetermined magnitude when the magnitude of the friction coefficient of the road surface estimated by the road surface friction coefficient estimation means is equal to or greater than the predetermined magnitude.

By virtue of these configurations, the electrical force generation mechanism operation means can operate the electrical force generation mechanism in the power running state to thereby generate an electromagnetic driving force of a predetermined magnitude, in accordance with the magnitude of the friction coefficient of the road surface estimated by the road surface friction coefficient estimation means; more specifically, when the magnitude of the estimated road surface friction coefficient is less than the predetermined friction coefficient; in other words, in a situation where the possibility of wheel locking increases. Meanwhile, the electrical force generation mechanism operation means can operate the electrical force generation mechanism in the regeneration state to thereby generate an electromagnetic braking force of a predetermined magnitude, when the magnitude of the estimated road surface friction coefficient is equal to or greater than the predetermined friction coefficient; in other words, in a situation where the possibility of wheel locking decreases.

With this operation, the following effects can be achieved. In a situation where the road surface friction coefficient is small and the possibility of wheel locking becomes higher, the reaction from the road surface is small, and it becomes difficult for the wheels to rotate due to mechanical loss (loss resistance) or the like. In such a situation, the electrical force generation mechanism operation means can cause the electrical force generation mechanism to generate an electromagnetic driving force of a predetermined magnitude. Therefore, rotations of the wheels can be recovered more quickly, whereby the vehicle can be braked. Meanwhile, in a situation where the road surface friction coefficient is relatively large and the possibility of wheel locking becomes lower, the electrical force generation mechanism operation means can cause the electrical force generation mechanism to generate an electromagnetic braking force of a predetermined magnitude. Therefore, the vehicle can be braked properly, and electric energy generated as a result of regeneration can be collected, whereby energy efficiency can be improved.

Furthermore, in this case, preferably, the predetermined magnitude of the electromagnetic driving force generated by the electrical force generation mechanism operated in the power running state by the electrical force generation mechanism operation means is less than a creep force required for creep traveling of the vehicle.

By virtue of this configuration, in a situation where the road surface friction coefficient is small and the possibility of wheel locking becomes higher, an electromagnetic driving force which is necessary and sufficient for recovering rotation of each wheel can be generated. Accordingly, the influence of the electromagnetic driving force on the braking of the vehicle can be made very small.

Furthermore, in this case, preferably, the predetermined magnitude of the electromagnetic driving force which is generated by the electrical force generation mechanism operated in the power running state by the electrical force generation mechanism operation means and which is applied to each rear wheel is greater than the predetermined magnitude of the electromagnetic driving force which is generated by the electrical force generation mechanism operated in the power running state by the electrical force generation mechanism operation means and which is applied to each front wheel.

By virtue of this configuration, in a situation where the road surface friction coefficient is small and the possibility of wheel locking becomes higher, rotations of the rear wheels can be recovered in an early stage preferentially over rotations of the front wheels. Accordingly, a satisfactory behavior stability of the vehicle can be maintained in a situation where the road surface friction coefficient is small and the possibility of wheel locking becomes higher.

Furthermore, in this case, preferably, the predetermined magnitude of the electromagnetic braking force which is generated by the electrical force generation mechanism operated in the regeneration state by the electrical force generation mechanism operation means is less than a maximum braking force which can be generated by the electrical force generation mechanism in the regeneration state.

This configuration makes it possible to cause the electrical force generation mechanism to generate a stable electromagnetic braking force in the regeneration state, while avoiding the influence of variation of the braking force which variation is likely to occur in the vicinity of the maximum braking force that the electrical force generation mechanism can generate. Accordingly, it becomes possible to effectively suppress an unnatural sensation which the driver senses during braking because of the variation of the braking force.

Furthermore, in this case, preferably, the braking force computation means computes the mechanical braking force by adding the electromagnetic driving force of the predetermined magnitude to the target braking force determined by the target braking force determination means, when the magnitude of the friction coefficient of the road surface estimated by the road surface friction coefficient estimation means is less than the predetermined magnitude and the electrical force generation mechanism operation means operates the electrical force generation mechanism in the power running state to thereby generate the electromagnetic driving force of the predetermined magnitude; and the braking force computation means computes the mechanical braking force by subtracting the electromagnetic braking force of the predetermined magnitude from the target braking force determined by the target braking force determination means, when the magnitude of the friction coefficient of the road surface estimated by the road surface friction coefficient estimation means is equal to or greater than the predetermined magnitude and the electrical force generation mechanism operation means operates the electrical force generation mechanism in the regeneration state to thereby generate the electromagnetic braking force of the predetermined magnitude.

By virtue of this configuration, the braking force computation means can properly compute the mechanical braking force for applying the target braking force to the wheel, in accordance with the electromagnetic driving force or the electromagnetic braking force of the predetermined magnitude generated by the electrical force generation mechanism operated in the power running state or the regeneration state by the electrical force generation mechanism operation means. In other words, the braking force computation means can compute the mechanical braking force while changing its magnitude in accordance with the force generated by the electrical force generation mechanism operated in the power running state or the regeneration state by the electrical force generation mechanism operation means; in other words, in accordance with the magnitude of the road surface friction coefficient estimated by the road surface friction coefficient estimation means.

Furthermore, in this case, preferably, the magnitude of the predetermined friction coefficient is the magnitude of the friction coefficient at the time when the difference between the target braking force and the electromagnetic braking force of the predetermined magnitude becomes approximately zero, the target braking force being computed by the target braking force determination means on the basis of the friction coefficient of the road surface estimated by the road surface friction coefficient estimation means, and the electromagnetic braking force being generated by the electrical force generation mechanism operated in the regeneration state by the electrical force generation mechanism operation means.

By virtue of this configuration, it becomes possible to operate the electrical force generation mechanism operation means and the braking force computation means, while using, as a reference, the magnitude of a predetermined friction coefficient at which the difference between the target braking force determined by making use of the estimated road surface friction coefficient and the electromagnetic braking force of the predetermined magnitude generated by the electrical force generation mechanism in the regeneration state; that is, the computed mechanical braking force becomes approximately zero. Specifically, while using the magnitude of the predetermined friction coefficient as a reference, the electrical force generation mechanism operation means can operate the electrical force generation mechanism in the power running state or the regeneration state, and the braking force computation means can compute the mechanical braking force, in accordance with the magnitude of the estimated road surface friction coefficient. Accordingly, in accordance with the state of the road surface on which the vehicle travels, the rotation of each wheel can be recovered more reliably, and the vehicle can be braked properly.

Furthermore, by mean of setting the magnitude of the predetermined friction coefficient at which the computed mechanical braking force becomes approximately zero, hysteresis can be provided between a situation where the magnitude of the estimated road surface friction coefficient decreases and a situation where the magnitude of the estimated road surface friction coefficient increases. In addition, it is possible to absorb error produced when the magnitude of the road surface friction coefficient is estimated. Therefore, in accordance with the state of the road surface on which the vehicle travels, rotations of the wheels can be recovered reliably and more properly, and the vehicle can be braked properly.

Furthermore, by mean of setting the magnitude of the predetermined friction coefficient at which the computed mechanical braking force becomes approximately zero, the raking force generation mechanism can be operated as follows. Immediately before the magnitude of the estimated road surface friction coefficient becomes equal to the magnitude of the predetermined friction coefficient set as described above (specifically, when the magnitude of the estimated road surface friction coefficient is greater than the magnitude of the predetermined friction coefficient), the operation state of the electrical force generation mechanism is switched between the power running state and the regeneration state, and the mechanical braking force for this switched state is computed, whereby the braking force generation mechanism can always apply the mechanical braking force to the wheel. That is, since the mechanical braking force calculated after the operating state of the electrical force generation mechanism is switched immediately before the magnitude of the estimated road surface friction coefficient becomes equal to the magnitude of the predetermined friction coefficient does not become zero, the braking force generation mechanism can always apply the mechanical braking force to the wheel. With this operation, for example, in the case where the braking force generation mechanism is operated by oil pressure, a time delay (response delay) produced when the mechanical braking force is increased and decreased by adjusting the oil pressure can be prevented effectively, whereby the vehicle can be braked with satisfactory responsiveness.

Furthermore, in these cases, preferably, the electrical force generation mechanism is provided for each of wheels of the vehicle; and the electrical force generation mechanism operation means is configured such that, when the electrical force generation mechanism operation means operates at least one of the electrical force generation mechanisms provided for the wheels in the power running state so as to generate the electromagnetic driving force of the predetermined magnitude, the electrical force generation mechanism operation means operates another electrical force generation mechanism in the regeneration state so as to generate an electromagnetic braking force which cancels out the electromagnetic driving force of the predetermined magnitude generated by the electrical force generation mechanism operated in the power running state.

By virtue of this configuration, even in the case where, in accordance with, for example, the state of the road surface, the electrical force generation mechanism operation means operates the electrical force generation mechanism provided for a certain wheel in the power running state and operates the electrical force generation mechanism provided for another wheel in the regeneration state, the electromagnetic driving force of the predetermined magnitude generated by the electrical force generation mechanism operated in the power running state can be cancelled out by the electromagnetic braking force generated by another electrical force generation mechanism, whereby a braking force required for braking the vehicle can be secured. Accordingly, the vehicle can be braked properly.

Another feature of the present invention resides in that the braking force control apparatus further comprises acceleration operation cancelling determination means for determining whether or not a driver has cancelled an acceleration operation of accelerating the vehicle by making use of at least the electromagnetic driving force generated by the electrical force generation mechanism, wherein, when the acceleration operation cancelling determination means determines that the acceleration operation has been cancelled, the electrical force generation mechanism operation means operates the electrical force generation mechanism in the power running state to thereby generate the electromagnetic driving force of the predetermined magnitude, and the braking force computation means computes a mechanical braking force for producing a previously set deceleration in the vehicle.

By virtue of this configuration, when the acceleration operation is cancelled by the driver, the electrical force generation mechanism operation means can operate the electrical force generation mechanism in the power running state. Therefore, even in the case where, after the drier's cancellation of the acceleration operation, the possibility of wheel locking increases because of a small road surface friction coefficient, rotations of the wheels can be recovered very smoothly and with satisfactory responsiveness, whereby the vehicle can be braked. Moreover, when the acceleration operation is cancelled by the driver, the braking force computation means can compute a mechanical braking force which produces a previously set deceleration in the vehicle, and the braking force generation mechanism can generate this computed mechanical braking force. Therefore, the driver can sense a proper deceleration after the cancellation of the acceleration operation, and does not sense any unnatural sensation.

Another feature of the present invention resides in that the electrical force generation mechanism operation means is configured such that, when the lock tendency determination means has determined that the wheel tends to lock and the electrical force generation mechanism operation means has operated the electrical force generation mechanism in the power running state, the electrical force generation mechanism operation means continues the operation of the electrical force generation mechanism in the power running state until the operation of the braking operation means by the driver is cancelled.

By virtue of this configuration, after the electrical force generation mechanism was once operated in the power running state because a small road surface friction coefficient had increased the possibility of wheel locking, the electrical force generation mechanism operation means can continue the operation of the electrical force generation mechanism in the power running state until the driver's operation of the braking operation means is cancelled. Thus, even in the case where the road surface friction coefficient decreases again after temporary recover of the road surface friction coefficient, rotations of the wheels can be recovered with very high responsiveness, whereby the vehicle can be braked properly.

BRIEF DESCRIPTION OF THE DRAWINGS

FIGS. 6(a) and 6(b) are charts for describing the relation between depressing force and frictional braking force, motor braking torque, and motor driving torque for the cases where an eABS control state flag is set to "A" and "B," respectively.

FIG. 10 is a chart for describing supplementation by a motor braking torque applied to the left front wheel in the case where a motor driving torque is applied to the right front wheel.

MODES FOR CARRYING OUT THE INVENTION

Figure 1:
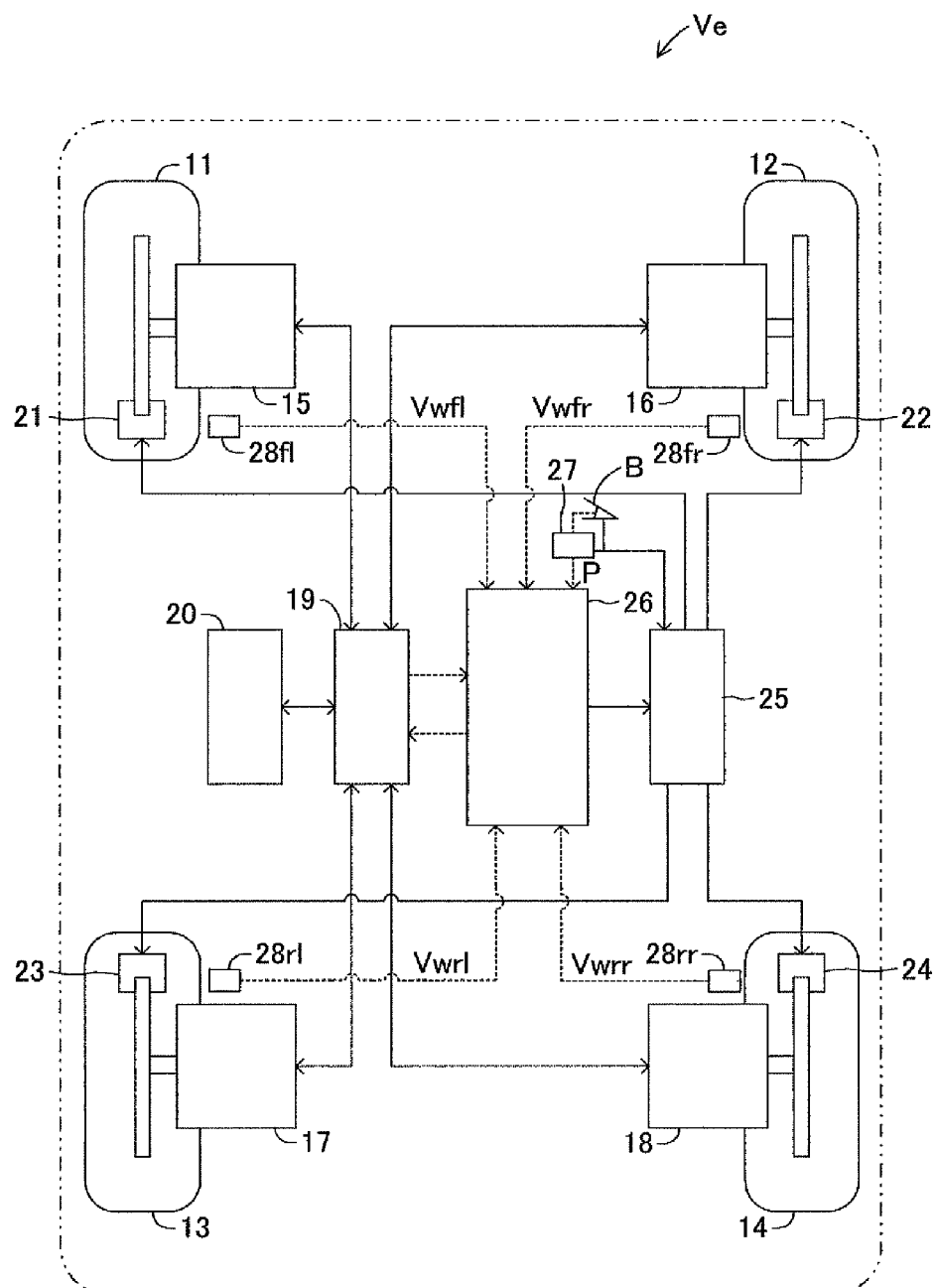
FIG. 1 is a diagram schematically showing the configuration of a vehicle to which a braking force control apparatus for a vehicle of the present invention can be applied.

An embodiment of the present invention will next be described in detail with reference to the drawings. FIG. 1 schematically shows the configuration of a vehicle Ve on which a braking force control apparatus for a vehicle according to the present embodiment is mounted.

The vehicle Ve includes left and right front wheels 11, 12 and left and right rear wheels 13, 14. Electric motors 15, 16 are built in the wheel bodies of the left and right front wheels 11, 12, and electric motors 17, 18 are built in the wheel bodies of the left and right rear wheels 13, 14. The electric motors 15 to 18 are connected, in a power transmittable manner, to the left and right front wheels 11, 12 and the left and right rear wheels 13, 14 via unillustrated respective power transmission systems (e.g., reduction gears). That is, the electric motors 15 to 18 are so-called in-wheel motors 15 to 18, and are disposed on unsprung portions of the vehicle Ve together with the left and right front wheels 11, 12 and the left and right rear wheels 13, 14. Driving forces and braking forces applied to the left and right front wheels 11, 12 and the left and right rear wheels 13, 14 can be controlled independently through independent control of rotations of the in-wheel motors 15 to 18.

Each of the in-wheel motors 15 to 18 is composed of an AC synchronous motor. DC power stored in an electricity storage unit 20, such as a battery or a capacitor, is converted to AC power by an inverter 19, and the AC power is supplied to the in-wheel motors 15 to 18. Thus, the in-wheel motors 15 to 18 are operated through drive control (that is, power running control) to thereby apply motor driving torques (electromagnetic driving forces) to the left and right front wheels 11, 12 and the left and right rear wheels 13, 14.

Furthermore, the in-wheel motors 15 to 18 can be operated through regeneration control in order to regenerate electric power by making use of rotational energies of the left and right front wheels 11, 12 and the left and right rear wheels 13, 14. Thus, when the in-wheel motors 15 to 18 are in the regeneration (power generation) state, the rotational (kinetic) energies of the left and right front wheels 11, 12 and the left and right rear wheels 13, 14 are converted to electric energy by the respective in-wheel motors 15 to 18, and the electric energy (regenerated power) is stored in the electricity storage unit 20 via the inverter 19. At that time, the in-wheel motors 15 to 18 apply to the left and right front wheels 11, 12 and the left and right rear wheels 13, 14 motor braking torques (electromagnetic braking forces) produced as a result of the regenerative power generation.

Furthermore, friction brake mechanisms 21, 22, 23, 24 are provided between the wheels 11 to 14 and the in-wheel motors 15 to 18, respectively. Each of the friction brake mechanisms 21 to 24 is a known braking apparatus, such as a disc brake or a drum brake. The friction brake mechanisms 21 to 24 apply frictional braking forces (mechanical braking forces generated through frictional engagement) to the left and right front wheels 11, 12 and the left and right rear wheels 13, 14. The friction brake mechanisms 21 to 24 are connected to brake actuators 25 which operate pistons of brake calipers or brake shoes (both of which are not shown), which apply braking forces to the wheels 11 to 14 by making use of oil pressure (hydraulic pressure) which is supplied from an unillustrated master cylinder in response to a depressing operation of a brake pedal B (brake operation means).

The inverter 19 and the brake actuators 25 are connected to an electronic control unit 26, which controls the rotation state (more specifically, a regeneration state or a power running state) of each of the in-wheel motors 15 to 18, and the operation state (more specifically, a braking state or a brake release state) of each of the friction brake mechanisms 21 to 24. Therefore, the in-wheel motors 15 to 18, the inverter 19, and the electricity storage unit 20 constitute the electrical force generation mechanism of the present invention; the friction brake mechanisms 21 to 24 and the brake actuators 25 constitute the braking force generation mechanism of the present invention; and the electronic control unit 26 constitutes the braking control means of the present invention.

The electronic control unit 26 includes, as a main component, a microcomputer composed of a CPU, ROM, RAM, etc., and executes various programs, including programs which will be described later. In order to execute the various programs, the electronic control unit 26 is configured to receive a signal from the inverter 19 and various signals from various sensors, including a brake sensor 27 which detects a depressing force P applied to the brake pedal B by a driver, and wheel speed sensors 28*i* (i=fl, fr, rl, rr) which detect the wheel speeds Vwi (i=fl, fr, rl, rr) of the wheels 11 to 14.

Since the sensors 27 and 28*i* (i=fl, fr, rl, rr) and the inverter 19 are connected to the electronic control unit 26 so as to input the respective signals thereto, the electronic control unit 26 can control the operations of the in-wheel motors 15 to 18 and the friction brake mechanisms 21 to 24, while grasping the traveling state of the vehicle Ve. Specifically, on the basis of the signals input from the brake sensor 27 and the wheel speed sensors 28*i* (i=fl, fr, rl, rr), the electronic control unit 26 can compute a braking force required to brake the vehicle Ve in accordance with the driver's brake operation amount. Moreover, the electronic control unit 26 can compute output torques (motor torques) of the in-wheel motors 15 to 18 on the basis of the signal input from the inverter 19 (for example, a signal representing electric energy or current supplied or regenerated during power running operation or regeneration operation of each of the in-wheel motors 15 to 18).

Thus, the electronic control unit 26 can output signals for controlling the rotation (more specifically, a power running state or a regeneration state) of each of the in-wheel motors 15 to 18 via the inverter 19, and signals for controlling the operation (more specifically, a braking state or a brake release state) of each of the friction brake mechanisms 21 to 24 via the brake actuators 25. Accordingly, the electronic control unit 26 can control the traveling state of the vehicle Ve; more specifically, the braking state of the vehicle Ve).

Figure 2:
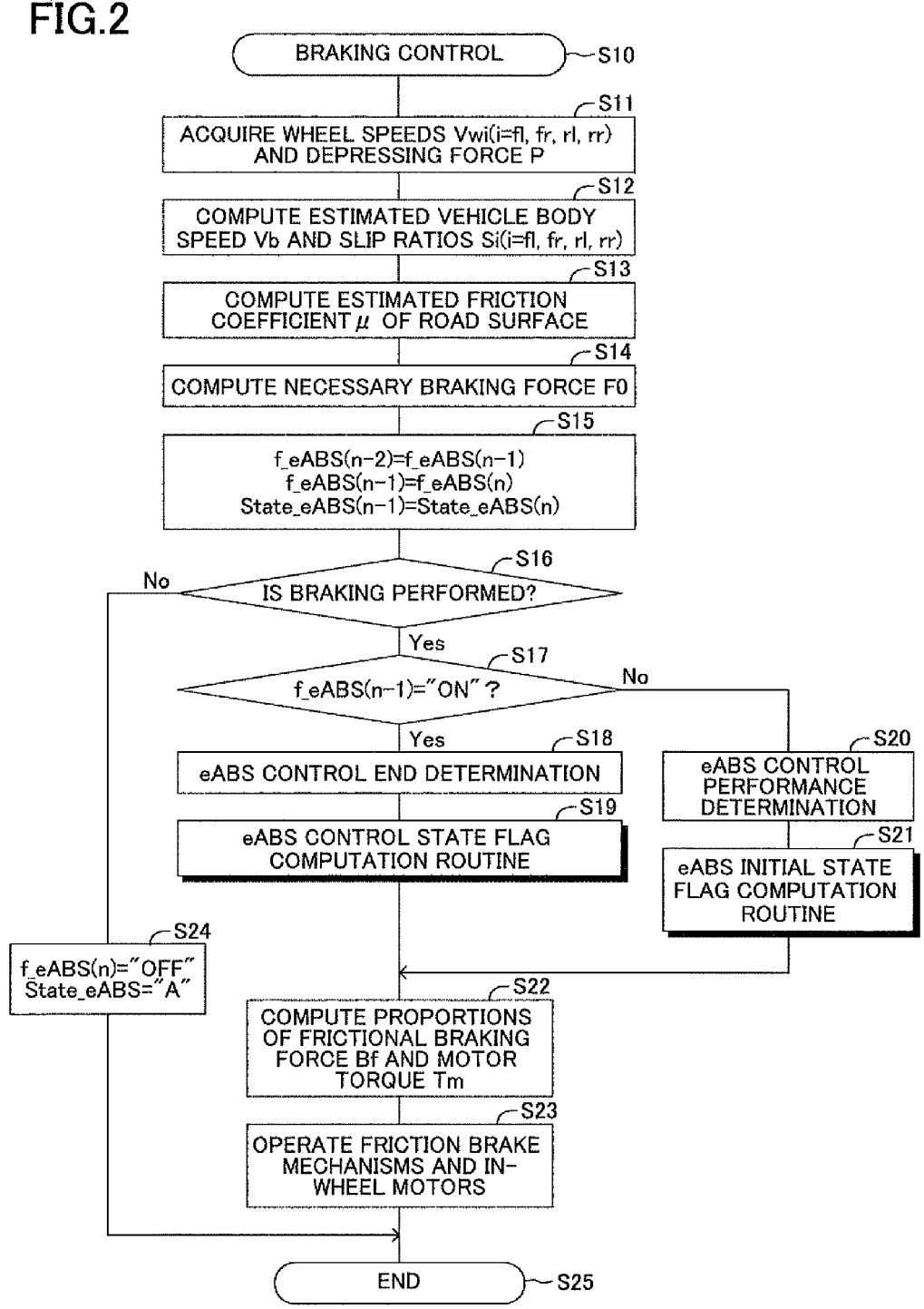
FIG. 2 is a flowchart of a braking control program executed by an electronic control unit of FIG. 1.

Next, control of operations of the in-wheel motors 15 to 18 and the friction brake mechanisms 21 to 24 (that is, braking force control) performed by the electronic control unit 26 will be described in detail. In order to control the braking of the vehicle Ve, the electronic control unit 26 (more specifically, the CPU) repeatedly executes a braking control program shown in FIG. 2 at predetermined short intervals. Specifically, the electronic control unit 26 starts the execution of the braking control program in step S10. In step S11 subsequent thereto, the electronic control unit 26 acquires a signal representing the depressing force P from the brake sensor 27, and signals representing the wheels speeds Vwi (i=fl, fr, rl, rr) of the wheels 11 to 14 from the wheel seed sensors 28*i* (i=fl, fr, rl, rr). After having acquired the signals, the electronic control unit 26 proceeds to step S12.

In step S12, the electronic control unit 26 determines an estimated vehicle body speed Vb on the basis of the wheels speeds Vwi (i=fl, fr, rl, rr) acquired from the wheel seed sensors 28*i* (i=fl, fr, rl, rr) in the above-described step S11, and calculates slip ratios Si (i=fl, fr, rl, rr) of the wheels 11 to 14 as deviations of the wheel speeds Vwi (i=fl, fr, rl, rr) from the estimated vehicle body speed Vb. Since well known computation methods which have been widely employed heretofore can be employed for computation of the estimated vehicle body speed Vb and the slip ratios Si (i=fl, fr, rl, rr), the computation methods employed here will be described only briefly.

The estimated vehicle body speed Vb is computed as follows. The electronic control unit 26 first selects, as an estimated vehicle body speed Vwb, one of the wheel speeds Vwi (i=fl, fr, rl, rr) of the wheels 11 to 14 which is considered to be the closest to the actual vehicle body speed. Subsequently, the electronic control unit 26 calculates an estimated vehicle body speed Vbn1 by subtracting from a previously computed estimated vehicle body speed Vbf a positive constant $\alpha 1$ for restricting an increase rate of the estimated vehicle body speed, and an estimated vehicle body speed Vbn2 by adding to the previously computed estimated vehicle body speed Vbf a positive constant $\alpha 2$ for restricting a decrease rate of the estimated vehicle body speed. The electronic control unit 26 then selects (determines) the middle value among the estimated vehicle body speed Vwb, the estimated vehicle body speed Vbn1, and the estimated vehicle body speed Vbn2 as the estimated vehicle body speed Vb at this time.

The slip ratios Si (i=fl, fr, rl, rr) are computed as follows. The electronic control unit 26 subtracts the wheel speeds Vwi (i=fl, fr, rl, rr) of the wheels 11 to 14 from the estimated (determined) vehicle body speed Vb. The electronic control unit 26 then divides the resultant values by the estimated vehicle body speed Vb to thereby obtain the estimated slip ratios Si (i=fl, fr, rl, rr) of the wheels 11 to 14. After having computed the estimated vehicle body speed Vb and the estimated slip ratios Si (i=fl, fr, rl, rr) of the wheels 11 to 14, the electronic control unit 26 proceeds to step S13. Notably, in the following description, in order to facilitate understanding, the slip ratios Si (i=fl, fr, rl, rr) of the wheels 11 to 14 will also be simply referred to as the "wheel slip ratio S."

Figure 3:
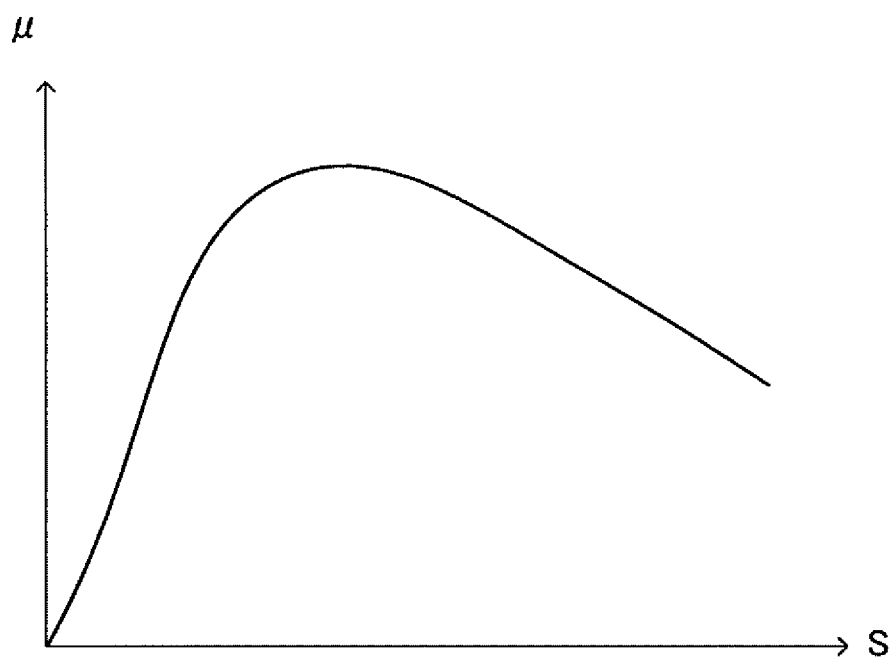
FIG. 3 is a graph showing the relation between slip ratio and friction coefficient of road surface.

In step S13, the electronic control unit 26 computes, through estimation, a road surface friction coefficient $\mu$ corresponding to the wheel slip ratio S computed in the above-described 512, on the basis of an S-$\mu$ characteristic shown in FIG. 3 which determines the relation between road surface friction coefficient and wheel slip ratio. As shown in FIG. 3, the road surface friction coefficient $\mu$ increases as the wheel slip ratio S increases, and when the wheel slip ratio S becomes equal to or greater than a certain value, the road surface friction coefficient $\mu$ gradually decreases as the wheel slip ratio S increases. After having computed the road surface friction coefficient $\mu$ through estimation, the electronic control unit 26 proceeds to step S14. Notably, in stead of using the S-$\mu$ characteristic shown in FIG. 3, the electronic control unit 26 can compute, through estimation, a road surface friction coefficient $\mu$ which becomes the maximum in accordance with the state of a road surface on which the vehicle Ve travels, because the road surface friction coefficient changes in accordance with the state of the road surface.

Figure 4:
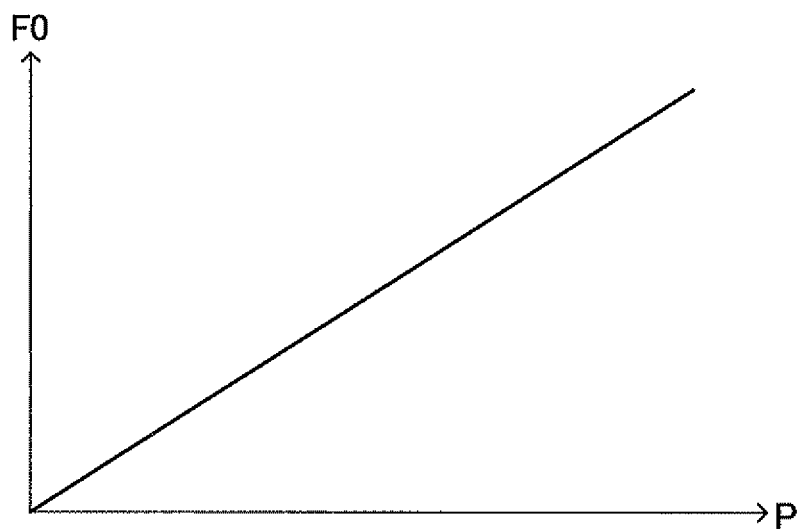
FIG. 4 is a graph showing the relation between depressing force of a brake pedal and necessary braking force.

In step S14, the electronic control unit 26 computes a braking force F0 necessary for braking the vehicle Ve (hereinafter referred to as the "necessary braking force F0") in accordance with the depressing force P applied to the brake pedal B, which was acquired from the brake sensor 27 in the above-described step S11. Specifically, the electronic control unit 26 computes the necessary braking force F0 which changes in proportion to the depressing force P as shown in FIG. 4. After having computed the necessary braking force F0, the electronic control unit 26 proceeds to step S15.

In step S15, the electronic control unit 26 sets a flag f_eABS which represents the state of performance of antiskid control for controlling the braking forces of the wheels 11 to 14 through coordinated operations of the in-wheel motors 15 to 18 and the friction brake mechanisms 21 to 24 when the slippages of the wheels 11 to 14 caused by braking are excessively large (when the wheels tend to lock) (hereinafter such antiskid control will be referred to as the "eABS control"). Hereinafter, the flag f_eABS will be referred to as the eABS performance state flag f_eABS. Also, the electronic control unit 26 sets a flag State_eABS which represents the state of the eABS control (hereinafter referred to as the eABS control state flag State_eABS). Notably, the eABS performance state flag f_eABS and the eABS control state flag State_eABS will be described in detail later.

That is, the electronic control unit 26 sets the value of an eABS performance state flag f_eABS(n−2), which represents the eABS performance state at the time of execution of the program before the previous execution thereof, to become equal to the value of an eABS performance state flag f_eABS(n−1), and sets the value of the eABS performance state flag f_eABS(n−1), which represents the eABS performance state at the time of the previous execution of the program, to becomes equal to the value of an eABS performance state flag f_eABS(n). Also, the electronic control unit 26 sets the value of an eABS control state flag State_eABS(n−1), which represents the eABS control state at the time of the previous execution of the program, to becomes equal to the value of an eABS control state flag State_eABS(n). After having set the eABS performance state flags f_eABS and the eABS control state flags State_eABS, the electronic control unit 26 proceeds to step S16.

In step S16, the electronic control unit 26 determines, on the basis of the value of the depressing force P acquired from the brake sensor 27 in the above-described step S11, whether or not braking is instructed by the driver; that is, whether or not braking is performed (ON). That is, in the case where the depressing force P is greater than "0," braking is instructed by the driver; i.e., braking is performed (ON). Therefore, the electronic control unit 26 makes a "Yes" determination, and proceeds to step S17. Meanwhile, in the case where the depressing force P is "0," braking is not instructed by the driver; i.e., braking is not performed. Therefore, the electronic control unit 26 makes a "No" determination, and proceeds to step S24.

In step S24, the electronic control unit 26 sets the value of the eABS performance state flag f_eABS(n) to an "OFF" value which represents that eABS control is not performed, because braking is not instructed by the driver. Furthermore, the electronic control unit 26 sets the value of the eABS control state flag State_eABS to a value which represents a state A to be described later. The value which represents the state A will be referred to as the "A" value. After having set the eABS performance state flag f_eABS(n) and the eABS control state flag State_eABS in this manner, the electronic control unit 26 proceeds to step S25.

In step S25, the electronic control unit 26 ends the current execution of the braking control program. Subsequently, the electronic control unit 26 again starts the execution of the braking control program in step S10 after elapse of a predetermined short period of time.

In step S17, the electronic control unit 26 determines whether or not the value of the eABS performance state flag f_eABS(n−1) is set to an "ON" value which represents that the eABS control is performed. That is, in the case where the eABS performance state flag f_eABS(n−1) is set to the "ON" value, the electronic control unit 26 makes a "Yes" determination, and proceeds to step S18. Meanwhile, in the case where the eABS performance state flag f_eABS(n−1) is not set the "ON" value; in other words, the value of the eABS performance state flag f_eABS(n—1) is the "OFF" value, the electronic control unit 26 makes a "No" determination, and proceeds to step S20.

In step S18, the electronic control unit 26 determines whether to end the eABS control, because the eABS control is executed at the present. More specifically, the electronic control unit 26 determines to end the execution of the eABS control, when the estimated vehicle body speed Vb computed in the above-described step S12 is equal to or less than a previously set, predetermined vehicle body speed Vbs, which is used in the eABS control performance determination processing of step S20 to be described later, or when the wheel slip ratio S computed in the above-described step S12 through estimation, is equal to or less than a previously set, predetermined slip ratio Ss, which is used in the eABS control performance determination processing of step S20. In the case where the electronic control unit 26 determines to end the execution of the eABS control, the electronic control unit 26 sets the value of the eABS performance state flag f_eABS(n) to the "OFF" value. In the case where the electronic control unit 26 determines not to end the execution of the eABS control, the electronic control unit 26 maintains the value of the eABS performance state flag f_eABS(n) at the "ON" value. Notably, needless to say, the determination as to whether or not the eABS control is to be ended may be performed on the basis of other various determination conditions.

After having executed the eABS control end determination processing in the above-described step S18, the electronic control unit 26 proceeds to step S19.

In step S19, the electronic control unit 26 executes an eABS control state flag computation routine for computing the eABS control state flag State_eABS. Hereinafter, this eABS control state flag computation routine will be described in detail.

Figure 5:
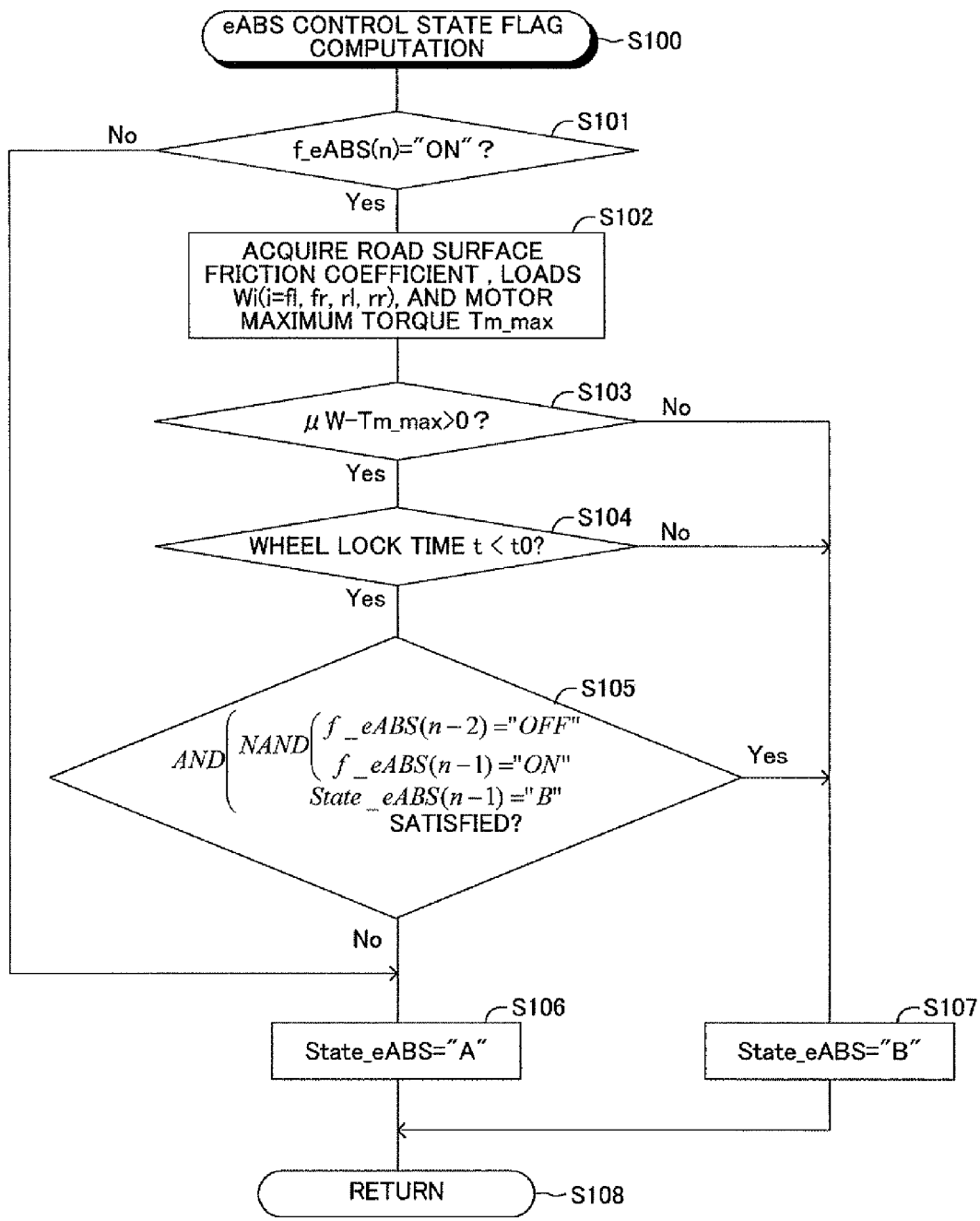
FIG. 5 is a flowchart showing an eABS control state flag computation routine of the braking control program of FIG. 2.

As shown in FIG. 5, execution of the eABS control state flag computation routine is started in step S100. In step S101 subsequent thereto, the electronic control unit 26 determines whether or not the value of the eABS performance state flag f_eABS(n) is the "ON" value. When the value of the eABS performance state flag f_eABS(n) is the "ON" value, the electronic control unit 26 makes a "Yes" determination, and proceeds to step S102. Meanwhile, when the value of the eABS performance state flag f_eABS(n) is not the "ON" value; in other words, when the value of the eABS performance state flag f_eABS(n) is the "OFF" value, the electronic control unit 26 makes a "No" determination, and proceeds to step S106.

In step S102, the electronic control unit 26 acquires the road surface friction coefficient μ computed, through estimation, in the above-described step S13 of the braking control program, and acquires loads Wi (i=fl, fr, rl, rr) at the positions of the wheels 11 to 14. Notably, in the following description, the loads Wi (i=fl, fr, rl, rr) at the positions of the wheels 11 to 14 will be simply referred to as the wheel position load W. Furthermore, the electronic control unit 26 acquires a motor maximum torque Tm_max which can be generated by each of the in-wheel motors 15 to 18. Notably, the motor maximum torque Tm_max may be set by means of inputting a previously set rated output torque of the in-wheel motors 15 to 18, or by means of inputting an output torque of the in-wheel motors 15 to 18 determined depending on the output capacity of the electricity storage unit 20.

In the case where the output torque of the in-wheel motors 15 to 18 determined depending on the output capacity of the electricity storage unit 20 is input as a motor maximum torque Tm_max, the motor maximum torque Tm_max changes in accordance with the output capacity of the electricity storage unit 20; that is, the amount of electricity charged into the electricity storage unit 20. Specifically, in the case where the amount of electricity charged into the electricity storage unit 20 is large (in the case where the in-wheel motors 15 to 18 can generate a large motor maximum torque Tm_max), the regeneration performance provided by the in-wheel motors 15 to 18 drops; in other words, it becomes easier for the in-wheel motors 15 to 18 to operate in a power running state. In the case where the amount of electricity charged into the electricity storage unit 20 is small (in the case where the in-wheel motors 15 to 18 can generate a small motor maximum torque Tm_max), the drive performance provided by the in-wheel motors 15 to 18 drops; in other words, it becomes easier for the in-wheel motors 15 to 18 to operate in a regeneration state.

After having acquired the road surface friction coefficient μ, the wheel position load W, and the motor maximum torque Tm_max, the electronic control unit 26 proceeds to step S103. In step S103, the electronic control unit 26 determines whether or not a relation represented by the following Eq. 1 holds.

$$\mu W - Tm\_max > 0 \qquad \text{Eq. 1}$$

Notably, in Eq. 1, μW of the first term of the left side represents a friction force to be generated between a wheel and a road surface; i.e., a target braking force, and will be referred to as an ideal braking force μW in the following description.

That is, in the case where the motor maximum torque Tm_max is smaller than the ideal braking force μW (the target braking force) and the above-mentioned Eq. 1 holds; in other words, in the case where the vehicle Ve travels on a high-μ road whose surface friction coefficient is relatively large, the electronic control unit 26 makes a "Yes" determination, and proceeds to step S104. Meanwhile, in the case where the motor maximum torque Tm_max is greater than the ideal braking force μW and the above-mentioned Eq. 1 does not hold; in other words, in the case where the vehicle Ve travels on a low-g road whose surface friction coefficient is small, the electronic control unit 26 makes a "No" determination, and proceeds to step S107.

In step S104, the electronic control unit 26 determines whether or not a time t over which locking of at least one of the left and right front wheels 11, 12 and the left and right rear wheels 13, 14 continues (hereinafter, the time t will be referred to as the wheel lock time t) is less than a previously set, predetermined time t0. The electronic control unit 26 makes such determination by making use of the wheel speeds Vwi (i=fl, fr, rl, rr) acquired in the above-described step S11 of the braking control program and the estimated vehicle body speed Vb determined in the above-described step S12. That is, in the case where the wheel lock time t is less (shorter) than the predetermined time t0, that is, in the case where the vehicle Ve travels on a high-μ road whose surface friction coefficient is relatively large, the electronic control unit 26 makes a "Yes" determination, and proceeds to step S105. Meanwhile, in the case where the wheel lock time t is greater (longer) than the predetermined time t0, in other words, in the case where the vehicle Ve travels on a low-μ road whose surface friction coefficient is small, the electronic control unit 26 makes a "No" determination, and proceeds to step S107.

In step S105, the electronic control unit 26 determines whether or not a condition represented by the logical operation of the following Eq. 2 is satisfied.

$$\text{AND}\begin{pmatrix} \text{NAND}\begin{pmatrix} \text{f\_eABS}(n-2) = \text{"OFF"} \\ \text{f\_eABS}(n-1) = \text{"ON"} \end{pmatrix} \\ \text{State\_eABS}(n-1)\text{"B"} \end{pmatrix} \qquad \text{Eq. 2}$$

Notably, in the condition represented by the logical operation of the following Eq. 2, the eABS control state flag State_eABS(n−1)="B" represents that the eABS control state is in the state B as will be described in step S107 to be described later.

That is, in the case where the condition represented by the logical operation of the following Eq. 2 is satisfied; in other words, in the case where the value of the eABS control state flag State_eABS is set to the state B in eABS control to be describe later, other than the initial state thereof (if the eABS control state has shifted to the state B), the electronic control unit 26 makes a "Yes" determination so as to maintain the state B until the eABS control ends. The electronic control unit 26 then proceeds to step S107. Meanwhile, in the case where, as will be described later, the value of the eABS control state flag State_eABS is set to the state A in order to operate the in-wheel motors 15 to 18 in the regeneration state in the initial state of the eABS control, and the condition represented by the logical operation of the following Eq. 2 is not satisfied, the electronic control unit 26 makes a "No" determination, and proceeds to step S106.

In step S106, the electronic control unit 26 sets the value of the eABS control state flag State_eABS to a value which represents the state A in which each of the in-wheel motors 15 to 18 generates a braking force in a regeneration state during the eABS control. That is, in this state A, at the time of eABS control, at least one of the in-wheel motors 15 to 18 operates as shown in FIG. 6(a). Specifically, in a state in which the at least one of the in-wheel motors 15 to 18 always generates braking force by the regeneration control performed by the electronic control unit 26, the at least one of the in-wheel motors 15 to 18 applies the ideal braking force μW (the necessary braking force F0) to the corresponding one of the wheels 11 to 14, through coordination with the corresponding one of the friction brake mechanisms 21 to 24.

In step S107, the electronic control unit 26 sets the value of the eABS control state flag State_eABS to a value which represents the state B in which each of the in-wheel motors 15 to 18 generates a driving force in a power running state at the time of eABS control. The value which represents the state B will be referred to as the "B" value. That is, in this state B, at the time of eABS control, at least one of the in-wheel motors 15 to 18 operates as shown in FIG. 6(b). Specifically, in a state in which the at least one of the in-wheel motors 15 to 18 always generates driving force by the power running control performed by the electronic control unit 26, the at least one of the in-wheel motors 15 to 18 applies the ideal braking force μW (the necessary braking force F0) to the corresponding one of the wheels 11 to 14, through coordination with the corresponding one of the friction brake mechanisms 21 to 24.

Notably, the value of the eABS control state flag State_eABS, which is set in the above-described step S106 or step S107, is initially set to the "B" value in principle, as will be described in detail in relation to the eABS control initial state flag computation routine to be described later.

After having set the value of the eABS control state flag State_eABS to the "A" value or the "B" value in the above-described step S106 or step S107, the electronic control unit 26 proceeds to step S108 so as to end the execution of the eABS control state flag computation routine. Then, the electronic control unit 26 returns to step S19 of the braking control program, and proceeds to step S22 of the program.

Meanwhile, in the case where the electronic control unit 26 makes a "No" determination in the above-described step S17 of the braking control program because the value of the eABS performance state flag f_eABS(n–1) is not the "ON" value, the electronic control unit 26 executes the processing of step S20.

In step S20, the electronic control unit 26 executes processing for determining whether to perform the eABS control, because the eABS control is not performed at the present. More specifically, the electronic control unit 26 determines to perform the eABS control, when the estimated vehicle body speed Vb computed in the above-described step S12 is greater than the previously set, predetermined vehicle body speed Vbs and the wheel slip ratio S computed in the above-described step S12 is greater than the predetermined slip ratio Ss. When the electronic control unit 26 determines to perform the eABS control, the electronic control unit 26 sets the value of the eABS performance state flag f_eABS(n) to the "ON" value. Meanwhile, when the electronic control unit 26 determines not to perform the eABS control, the electronic control unit 26 maintains the value of the eABS performance state flag f_eABS(n) at the "OFF" value. Notably, needless to say, the determination as to whether or not the eABS control is to be performed may be performed on the basis of other various determination conditions.

After having determined in the above-described step S20 whether to perform the eABS control, the electronic control unit 26 proceeds to step S21.

In step S21, the electronic control unit 26 executes an eABS control initial state flag computation routine for computing the initial state of the eABS control. Hereinafter, this eABS control initial state flag computation routine will be described in detail.

Figure 7:
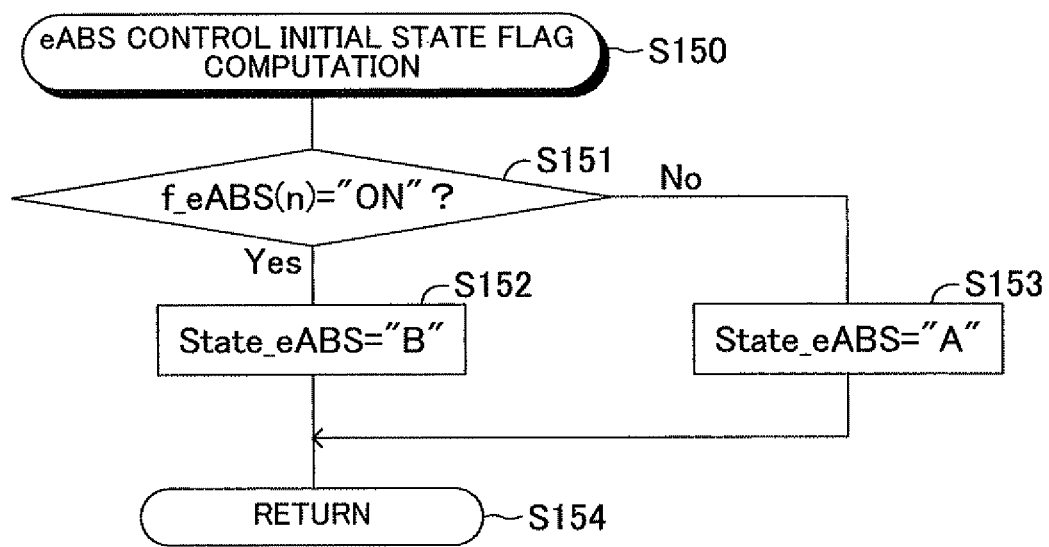
FIG. 7 is a flowchart showing an eABS control initial state flag computation routine of the braking control program of FIG. 2.

In order to properly perform the eABS control even in a situation where the road surface friction coefficient μ is very small, in principle, the electronic control unit 26 enables the eABS control to be started (performed) from the above-described state B (initial state), by executing the eABS control initial state flag computation routine shown in FIG. 7. This routine will be described specifically. The electronic control unit 26 starts the eABS control initial state flag computation routine shown in FIG. 7 in step S150. In step S151 subsequent thereto, the electronic control unit 26 determines whether or not the value of the eABS performance state flag f_eABS(n) is the "ON" value. That is, in the case where the value of the eABS performance state flag f_eABS(n) is the "ON" value, the electronic control unit 26 makes a "Yes" determination, and proceeds to step S152. Meanwhile, in the case where the value of the eABS performance state flag f_eABS(n) is not the "ON" value; i.e., in the case where the value of the eABS performance state flag f_eABS(n) is the "OFF" value and the eABS control is not performed, the electronic control unit 26 makes a "No" determination, and proceeds to step S153.

In the step S152, which is executed when the value of the eABS performance state flag f_eABS(n) is the "ON" value, the electronic control unit 26 sets the value of the eABS control state flag State_eABS in the initial state to the "B" value, which represents the state B in which the in-wheel motors 15 to 18 generate driving forces in the power running state during the eABS control. Meanwhile, in the step S153, which is executed when the value of the eABS performance state flag f_eABS(n) is the "OFF" value, the electronic control unit 26 sets the value of the eABS control state flag State_eABS in the initial state to the "A" value, which represents the state A in which the in-wheel motors 15 to 18 generate braking forces in the regeneration state in a state in which the eABS control is not performed.

With this operation, the value of the eABS control state flag State_eABS is set to the "B" value in the initial state in which the value of the eABS performance state flag f_eABS(n) is set to the "ON" value as a result of execution of the above-described step S20 of the braking control program and the eABS control. Therefore, the eABS control according to the present invention is started from the state B, in which the electronic control unit 26 causes the in-wheel motors 15 to 18 to always generate driving forces through power running control, and causes the friction brake mechanisms 21 to 24 to generate frictional braking forces, to thereby apply the ideal braking force μW to each of the wheels 11 to 14.

After having executed the above-described step S152 or step S153, the electronic control unit 26 proceeds to step S154. In step S154, the electronic control unit 26 ends the execution of the eABS control initial state flag computation routine, and returns to the above-described step S21 of the braking control program.

After having executed the eABS control initial state flag computation routine in step S21 of the braking control program, the electronic control unit 26 proceeds to step S22.

In step S22, the electronic control unit 26 calculates the proportion of the frictional braking force Bf generated by each of the friction brake mechanisms 21 to 24 and the proportion of the motor torque (braking force or driving force) Tm generated by each of the in-wheel motors 15 to 18. In this case, the electronic control unit 26 computes the magnitude of the frictional braking force Bf generated by each of the friction brake mechanisms 21 to 24 (the proportion of the frictional braking force Bf to the ideal braking force μW (the necessary braking force F0)), and the magnitude of the motor torque Tm generated by each of the in-wheel motors 15 to 18 (the proportion of the motor torque Tm to the ideal braking force μW (the necessary braking force F0)), in accordance with the value of the eABS control state flag State_eABS set in the above-described step S19 or step S21; that is, in accordance with the eABS control state (the state A or the state B).

More specifically, in the case where the value of the eABS control state flag State_eABS is the "A" value, in the state A, the electronic control unit 26 performs the regeneration control for at least one of the in-wheel motors 15 to 18 which requires the eABS control, to thereby cause the at least one in-wheel motor to generate a motor braking torque Tmr (electromagnetic braking force) of a predetermined magnitude, as a motor torque Tm. Therefore, the electronic control unit 26 calculates the frictional braking force Bf (absolute value) in accordance with the following Eq. 3, which uses the ideal braking force μW (absolute value) and the motor braking torque Tmr (absolute value). Notably, each of the ideal braking force μW, the motor braking torque Tmr, and the frictional braking force Bf is represented by a positive value when the acting direction is considered.

$$Bf = \mu W - Tmr \qquad \text{Eq. 3}$$

Notably, the motor braking torque Tmr in Eq. 3 is set in advance as a braking torque to be generated by each of the in-wheel motors 15 to 18 through the regeneration control at the time of braking, and the magnitude of the motor braking torque Tmr is set to be less than the motor maximum torque Tm_max as will be described later.

In the case where the value of the eABS control state flag State_eABS is the "B" value, in the state B, the electronic control unit 26 performs the power running control for at least one of the in-wheel motors 15 to 18 which requires the eABS control, to thereby cause the at least one in-wheel motor to generate a motor driving torque Tmc (electromagnetic driving force) of a predetermined magnitude, as a motor torque Tm. Therefore, the electronic control unit 26 computes the frictional braking force Bf (absolute value) in accordance with the following Eq. 4, which uses the ideal braking force μW (absolute value) and the motor driving torque Tmc (absolute value). Notably, the motor driving torque Tmc is represented by a negative value when the acting direction is considered.

$$Bf = \mu W + Tmc \quad \text{Eq. 4}$$

Notably, the motor braking torque Tmc in Eq. 4 is set in advance as a torque to be generated by each of the in-wheel motors 15 to 18 through the power running control at the time of braking, and the magnitude of the motor braking torque Tmc is set to be less than a torque (so-called creep torque) which must be generated by the in-wheel motors 15 to 18 for creep traveling of the vehicle Ve.

The frictional braking force Bf computed in accordance with the above-mentioned Eq. 3 or Eq. 4 will be described with reference to FIG. 8. As described above, when the value of the eABS control state flag State_eABS is the "A" value, each of the in-wheel motors 15 to 18 generates the motor braking torque Tmr in the regeneration state. Therefore, in accordance with the above-mentioned Eq. 3, the frictional braking force Bf (absolute value) is computed, as a difference, by subtracting the motor braking torque Tmr (absolute value) from the ideal braking force μW (absolute value). In other words, in the state A, as shown in FIG. 8, the ideal braking force μW (absolute value) is realized as the sum of the frictional braking force Bf (absolute value) and the motor braking torque Tmr (absolute value), which act in the same direction.

Meanwhile, as described above, when the value of the eABS control state flag State_eABS is the "B" value, each of the in-wheel motors 15 to 18 generates the motor driving torque Tmc as a result of the power running control. Therefore, in accordance with the above-mentioned Eq. 4, the frictional braking force Bf (absolute value) is computed, as a difference, by adding the motor braking torque Tmc (absolute value) to the ideal braking force μW (absolute value). In other words, in the state B, as shown in FIG. 8, the ideal braking force μW (absolute value) is realized as the difference between the frictional braking force Bf (absolute value) and the motor driving torque Tmc (absolute value), which act in opposite directions.

Figure 8:
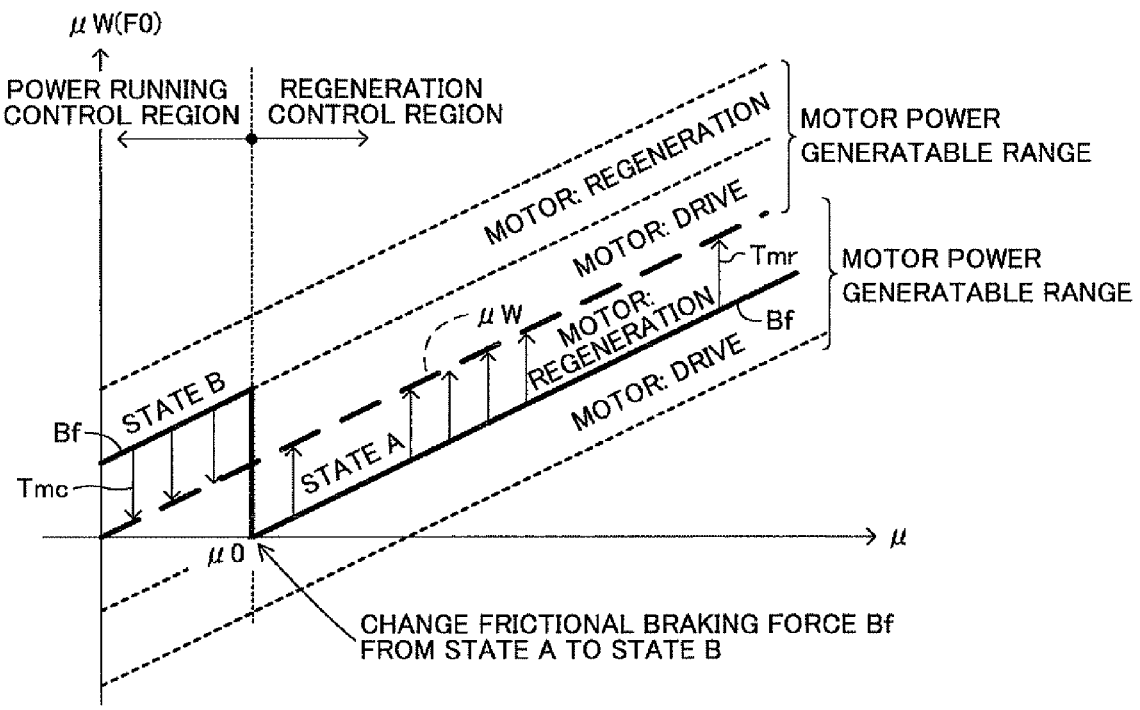
FIG. 8 is a chart for describing the relation among friction coefficient of road surface, frictional braking force, motor braking torque, and motor driving torque.

Here, there will be considered the case where, as shown in FIG. 8, the frictional braking force Bf (absolute value) computed in accordance with the above-mentioned Eq. 3 in the state A becomes approximately zero; in other words, the road surface friction coefficient μ becomes less than the predetermined friction coefficient μ0 and it becomes impossible to apply the frictional braking force Bf to the road surface; in other words, the frictional braking force Bf, which is computed in accordance with the above-mentioned Eq. 3 (i.e., by subtracting the motor braking torque Tmr (corresponding to the motor maximum torque Tm_max) from the ideal braking force μ0W for the road surface friction coefficient μ0), becomes zero. In such a case, as is apparent from the determination processing of the above-mentioned step S103 of the above-described eABS control state flag computation routine, the operation state is switched from the state A to the state B, whereby the frictional braking force Bf is computed in accordance with the above-mentioned Eq. 4, which uses the motor driving torque Tmc. That is, the frictional braking force Bf is changed at the point when the magnitude (proportion) of the frictional braking force Bf computed by use of the motor braking torque Tmr becomes zero (more specifically, at the point when the road surface friction coefficient, which changes every moment, becomes μ0).

Figure 9:
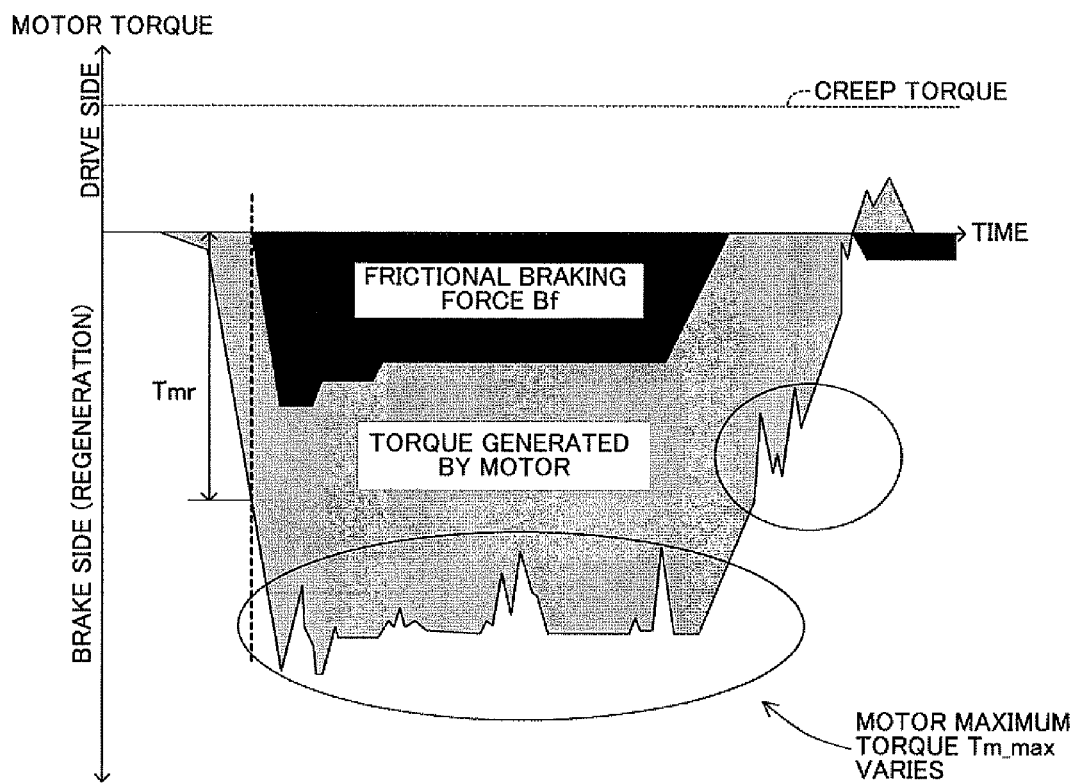
FIG. 9 is a chart for describing the set magnitude of motor braking torque.

Incidentally, in general, the braking-side motor maximum torque Tm_max, which is generated as a result of the regeneration control, varies as schematically shown in FIG. 9. In such a case, if the frictional braking force Bf is computed in accordance with the above-mentioned Eq. 3 with the motor braking torque Tmr being set to the braking-side motor maximum torque Tm_max, the frictional braking force Bf may be influenced by variation of the motor maximum torque Tm_max. Therefore, the motor braking torque Tmr can be set to a value which is smaller than the motor maximum torque Tm_max so that the influence of the variation of the motor maximum torque Tm_max is suppressed.

As described above, the magnitude of the motor driving torque Tmc is set to be less than the creep torque required for creep traveling of the vehicle Ve. In such a case, in order to enable a driver to correct a change in the behavior of the vehicle Ve and stabilize the behavior at an early stage in a situation where the vehicle is traveling on a road having a small road surface friction coefficient μ, locking of the left and right rear wheels 13, 14 must be eliminated preferentially over elimination of locking of the left and right front wheels 11, 12. Therefore, the magnitudes of motor driving torques Tmci (i=rl, rr) generated by the in-wheel motors 17, 18 of the left and right rear wheels 13, 14 are set to be less than the creep torque, and can be set to be greater than the magnitudes of the motor driving torques Tmci (i=fl, fr) generated by the in-wheel motors 15, 16 of the left and right front wheels 11, 12. In this case, specifically, the creep torque can be distributed between the left and right front wheels 11, 12 and the left and right rear wheels 13, 14, for example, in accordance with the loads acting on the front and rear axles of the vehicle Ve.

Moreover, in the state B, the ideal braking force μW (absolute value) is realized as the difference between the frictional braking force Bf (absolute value) and the motor driving torque Tmc (absolute value), which act in opposite directions. In this case, the necessary braking force F0 applied to each of the wheels 11 to 14 so as to brake the vehicle Ve may become small. Therefore, the braking force can be supplemented by wheel(s) which is a wheel(s) other than the wheel(s) generating the ideal braking force μW in the state B and which generates the deal braking force μW in the state A.

This supplementing operation will be described specifically, while the left and right front wheels 11, 12 are taken as an example. For example, in a situation where the road surface friction coefficient μ at the left front wheel 11 is greater than the above-mentioned friction coefficient μ0 and the road surface friction coefficient μ at the right font wheel 12 is less than the above-mentioned friction coefficient μ0, the electronic control unit 26 controls the braking force of the left front wheel 11 in the state A, and controls the braking force of the right front wheel 12 in the state B. That is, the electronic control unit 26 operates the in-wheel motor 15 of the left front wheel 11 in the regeneration state so as to generate the motor braking torque Tmr, and determines the frictional braking force Bf, generated by the friction brake mechanism 21, in accordance with the above-mentioned Eq. 3. Meanwhile, the electronic control unit 26 operates the in-wheel motor 16 of the right front wheel 12 in the power running state so as to generate the motor driving torque Tmc, and determines the frictional braking force Bf, generated by the friction brake mechanism 22, in accordance with the above-mentioned Eq. 4.

In this case, as shown in FIG. 10, when the electronic control unit 26 causes the in-wheel motor 16 of the right front wheel 12 to generate the motor driving torque Tmc, the electronic control unit 26 supplements the motor braking torque Tmr generated by the in-wheel motor 15 of the left front wheel 11 by increasing it by an amount corresponding to the motor driving torque Tmc generated by the in-wheel motor 16; in other words, the electronic control unit 26 supplements the motor braking torque Tmr generated by the in-wheel motor 15 so as to cancel out the motor driving torque Tmc generated by the in-wheel motor 16. This operation can maintain the sum total of the necessary braking forces F0 which the left and right front wheels 11, 12 must generate so as to brake the vehicle Ve.

Notably, in the case where the motor braking torque Tmr is increased so as to cancel out the motor driving torque Tmc, an upper limit may be provided for the torque to be added to the motor braking torque Tmr in consideration of a change in behavior of the vehicle Ve in the lateral direction. Furthermore, the amount of the torque to be added can be determined by, for example, subtracting from the amount corresponding to the motor driving torque Tmc, an amount corresponding to friction of the drive shaft, etc. Moreover, in a situation where the braking forces of all the wheels 11 to 14 are controlled in the state B, the sum total of the necessary braking forces F0 which must be generated so as to brake the vehicle Ve can be maintained by, for example, supplementing the frictional braking forces Bf of the friction brake mechanisms 21 to 24 by increasing the frictional braking forces Bf, or restricting the magnitude of the motor driving torque Tmc.

After having determined the motor braking torque Tmr or the motor driving torque Tmc and determined the frictional braking force Bf through computation in step S22, the electronic control unit 26 proceeds to step S23.

In step S23, the electronic control unit 26 causes each of the in-wheel motors 15 to 18 to generate the motor braking torque Tmr or the motor driving torque Tmc determined in the above-mentioned step S22 in accordance with the state A or the state B, and causes each of the friction brake mechanisms 21 to 24 to generate the frictional braking force Bf, to thereby apply the ideal braking force μW to each of the wheels 11 to 14. Thus, the necessary braking force F0 determined in the above-mentioned step S14 is applied to the vehicle Ve.

Specifically, the electronic control unit 26 drives the in-wheel motors 15 to 18 by the regeneration control or the power running control via the inverter 19 to thereby cause the in-wheel motors 15 to 18 to generate the motor braking torque Tmr or the motor driving torque Tmc. Furthermore, the electronic control unit 26 operates the friction brake mechanisms 21 to 24 via the actuators 25 so as to cause the friction brake mechanisms 21 to 24 to generate the frictional braking force Bf. With this operation, the electronic control unit 26 applies the ideal braking force μW to the left and right front wheels 11, 12 and the left and right rear wheels 13, 14, to thereby apply to the vehicle Ve the necessary braking force F0 determined in the above-mentioned step S14.

After having applied the ideal braking force μW to the left and right front wheels 11, 12 and the left and right rear wheels 13, 14 to thereby apply to the vehicle Ve the necessary braking force F0 determined in the above-mentioned step S14, the electronic control unit 26 proceeds to step S25 so as to end the current execution of the braking control program. Subsequently, after elapse of the predetermined short time, the electronic control unit 26 starts the execution of the program in the above-mentioned step S10.

Here, operation realized by the electronic control unit 26 through execution of the above-described braking control program will be described with reference to FIG. 11.

In a state in which the brake pedal B is not operated by a driver, the electronic control unit 26 executes the processings of the above-mentioned steps S10 to S16 and S24 of the braking control program. As result, the electronic control unit 26 computes the necessary braking force F0 to be zero, determines that braking is not performed, and sets the value of the eABS performance state flag f_eABS(n) to the "OFF" value and the value of the eABS control state flag State_eABS to the "A" value. Accordingly, in the state in which the brake pedal B is not operated by the driver; that is, in the state in which braking is not performed, as shown in FIG. 11, each of the ideal braking force μW (the necessary braking force F0), the frictional braking force Bf, the motor braking torque Tmr, and the motor driving torque Tmc is maintained at zero.

When the brake pedal B is operated by the driver in this state, the electronic control unit 26 executes the processings of step S10 to S23 of the braking control program. Before the eABS control is started (performed), the state A is maintained as shown in FIG. 11. When the depressing force P applied to the brake pedal B by the driver increases, the motor braking torque Tmr is first increased in proportion to the depressing force P, and is then maintained at a constant level. Meanwhile, while the motor braking torque Tmr is maintained at the constant level, the frictional braking force Bf increases, whereby the ideal braking force μW (the necessary braking force F0) increases uniformly.

When the driver's depressing force P increases and the eABS control is started, the electronic control unit 26 executes the above-mentioned steps S100 to S108 of the eABS control state flag computation routine. On the basis of the result of the determination in the above-mentioned step S101, the state A is maintained when the vehicle travels on a high-μ road whose road surface friction coefficient μ is greater than the friction coefficient μ0. At this time, as shown in FIG. 11, the electronic control unit 26 maintains the frictional braking force Bf approximately constant at a level previously set for the state A. Meanwhile, in order to avoid locking (that is, restore gripping of each tire), the electronic control unit 26 periodically changes the magnitude of the motor braking torque Tmr through the regeneration control in accordance with the states of the wheels 11 to 14. Since the ideal braking force μW (the necessary braking force F0) changes or increases and decreases periodically as a result of the periodical change of the motor braking torque Tmr, locking of the wheels 11 to 14 can be prevented effectively.

When the friction coefficient μ of the road surface decreases in this state, the ideal braking force μW (the necessary braking force F0) decreases because of a drop in frictional force between the road surface and the wheels 11 to 14. Therefore, the frictional braking force Bf in the state A, which is calculated by the electronic control unit 26 in accordance with the above-mentioned Eq. 3 in the above-mentioned step S22 of the braking control program, decreases because the motor braking torque Tmr is constant.

When the road surface friction coefficient μ drops to the friction coefficient μ0, the frictional braking force Bf becomes approximately zero. Therefore, when the vehicle travels on a very-low-μ road whose road surface friction coefficient μ is very small, the electronic control unit 26 changes the control state from the state A to the state B on the basis of the result of the determination in the above-mentioned step S101 of the eABS control state flag computation routine. As a result of shift of the control state from the state A to the state B, the electronic control unit 26 computes the frictional braking force Bf in the state B in accordance with the above-mentioned Eq. 4 in the above-mentioned step S22 of the braking control program, and operates the in-wheel motors 15 to 18 through the power running control, to thereby cause the in-wheel motors 15 to 18 to generate the motor driving torque Tmc. As a result, as shown in FIG. 11, the electronic control unit 26 maintains the frictional braking force Bf approximately constant at a level previously set for the state B. Meanwhile, the electronic control unit 26 periodically changes the magnitude of the motor driving torque Tmc through the power running control. Thus, the ideal braking force μW (the necessary braking force F0) changes or increases and decreases periodically as a result of the periodical change of the motor driving torque Tmc. Therefore, on a very-low-μ road, the wheels 11 to 14 can be rotated in an early stage by the action of the motor driving torque Tmc, whereby locking can be prevented effectively.

Moreover, when the road surface friction coefficient μ recovers and becomes greater than the friction coefficient μ0, the electronic control unit 26 maintains the state B in accordance with the determination processing of the step S105 of the eABS control state flag computation routine. Therefore, as shown in FIG. 11, although the frictional braking force Bf and the ideal braking force μW (the necessary braking force F0) increase as a result of the recovering of the road surface friction coefficient μ, the in-wheel motors 15 to 18 are continuously caused to periodically change the magnitude of the motor driving torque Tmc in the power running state. Thus, it becomes possible to reduce the frequency at which the operation state shifts from the state B to the state A as a result of recovery of the road surface friction coefficient μ; in other words, the frequency at which the motor torque generated by each of the in-wheel motors 15 to 18 changes from the motor driving torque Tmc to the motor braking torque Tmr.

Figure 11:
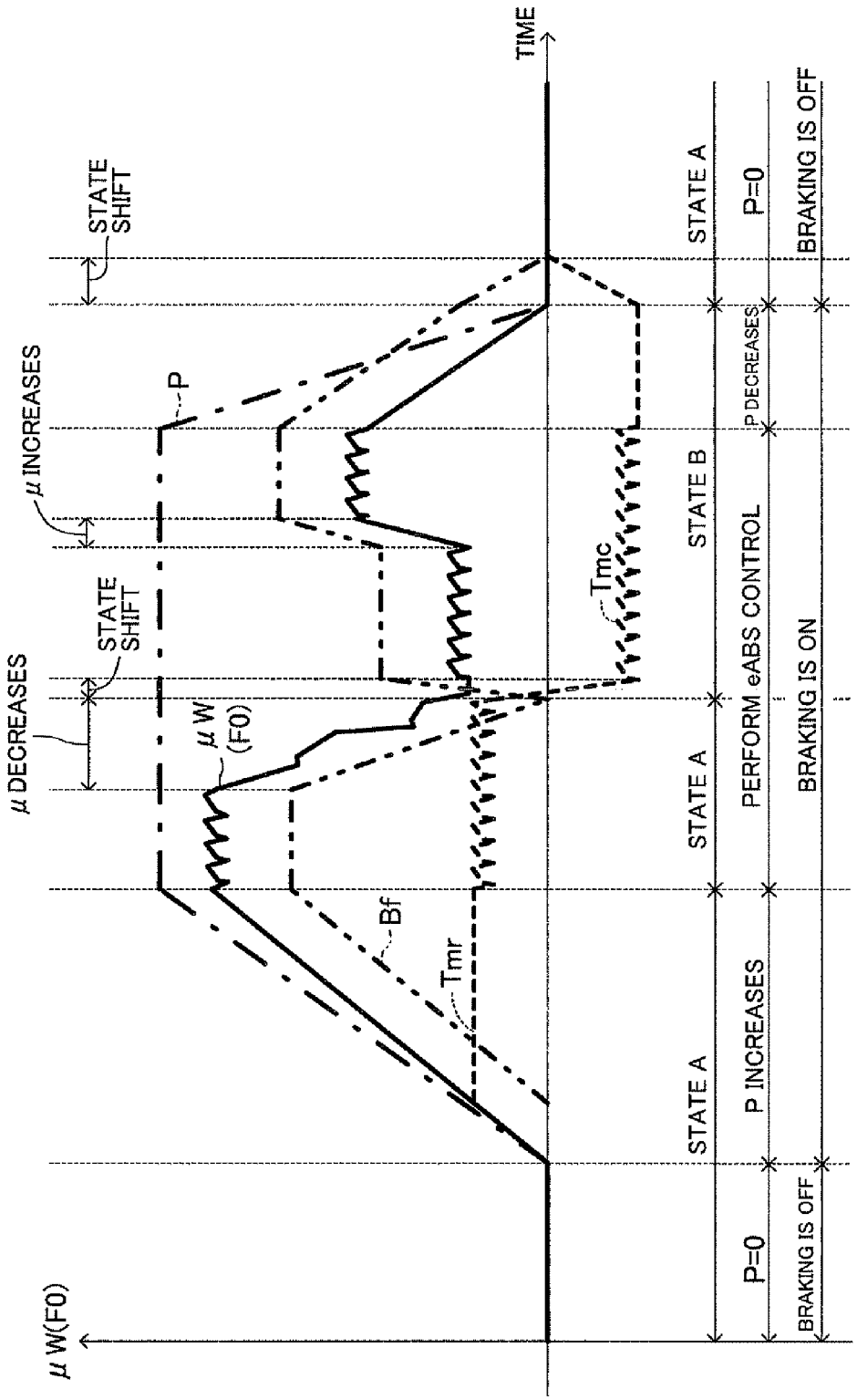
FIG. 11 is a time chart showing time course changes of depressing force, ideal braking force (necessary braking force), frictional braking force, motor braking torque, and motor driving torque.

Subsequently, as the depressing force P applied to the brake pedal B by the driver decreases, as shown in FIG. 11, the ideal braking force μW (the necessary braking force F0) and the frictional braking force Bf decrease uniformly, and the operation of each of the in-wheel motors 15 to 18 for periodically changing the motor driving torque Tmc in the power running state is stopped. After that, when the depressing force P becomes zero; i.e., the braking is stopped, as shown in FIG. 11, the operation state is shifted from the state B to the state A. When the operation state is shifted from the state B to the state A, each of the frictional braking force Bf and the motor driving torque Tmc becomes zero after elapse of a predetermined time in a state in which the ideal braking force μW (the necessary braking force F0) is maintained at zero.

As can be understood from the above description, according to the above-described embodiment, when at least one of the wheels 11 to 14 tends to lock, the electronic control unit 26 sets the value of the eABS performance state flag f_eABS(n) to the "ON" value, and sets the value of the eABS control state flag State_eABS to the "A" value or the "B" value. In the state A, the electronic control unit 26 operates each of the in-wheel motors 15 to 18 in the regeneration state so as to generate the motor braking torque Tmr, and causes each of the friction brake mechanisms 21 to 24 to generate the frictional braking force Bf computed in accordance with the above-mentioned Eq. 3. In the state B, the electronic control unit 26 operates each of the in-wheel motors 15 to 18 in the power running state so as to generate the motor driving torque Tmc, and causes each of the friction brake mechanisms 21 to 24 to generate the frictional braking force Bf computed in accordance with the above-mentioned Eq. 4.

With this operation, in the case where the eABS control state is the state B, since the electronic control unit 26 can cause each of the in-wheel motors 15 to 18 to generate the motor driving torque Tmc, rotations of the wheels 11 to 14 can be recovered more quickly, whereby the vehicle Ve can be braked properly. Meanwhile, in the case where the eABS control state is the state A, since the electronic control unit 26 can cause each of the in-wheel motors 15 to 18 to generate the motor braking torque Tmr, the vehicle Ve can be braked properly, and electric energy generated as a result of regeneration can be collected, whereby energy efficiency can be improved.

Furthermore, during the eABS control, the electronic control unit 26 does not cause the in-wheel motors 15 to 18 to repeatedly and alternately generate the motor braking torque Tmr and the motor driving torque Tmc. Therefore, even in the case where each of the in-wheel motors 15 to 18 includes a reduction gear and has backlash, time lag in control, which would otherwise arises due to backlash, does not arise. Accordingly, satisfactory responsiveness can be secured, and the eABS control can be carried out more precisely. Furthermore, during the eABS control, the electronic control unit 26 does not cause the in-wheel motors 15 to 18 to repeatedly and alternately generate the motor braking torque Tmr and the motor driving torque Tmc. Therefore, generation of noise stemming from backlash can be prevented, and impartment of unnatural sensation to the driver can be prevented effectively.

Moreover, in the case where the electronic control unit 26 causes each of the in-wheel motors 15 to 18 to generate the motor braking torque Tmr or the motor driving torque Tmc during the eABS control, the electronic control unit 26 can cause each of the friction brake mechanisms 21 to 24 to generate the frictional braking force Bf calculated in accordance with the above-mentioned Eq. 3 or Eq. 4.

Thus, the friction brake mechanisms 21 to 24 can always apply the frictional braking forces Bf of proper magnitudes to the wheels 11 to 14. Accordingly, even in the case where the in-wheel motors 15 to 18 generate the motor driving torque Tmc in the power running state, the ideal braking force μW (the necessary braking force F0) can be applied to the wheels 11 to 14 at all times, whereby the robustness of control can be improved. Furthermore, the friction brake mechanisms 21 to 24 can apply the frictional braking force Bf having a proper magnitude to the wheels 11 to 14. Therefore, even in the case where operations of the in-wheel motors 15 to 18 become anomalous, and the in-wheel motors 15 to 18 are stopped, the vehicle Ve can be braked without any response delay.

a. First Modification

In the above-described embodiment, the electronic control unit 26 executes the eABS control state flag computation routine shown in FIG. 5 in the above-mentioned step S19, and sets the value of the eABS control state flag State_eABS to the "A" value or the "B" value when the value of the eABS performance state flag f_eABS(n) is the "ON" value; that is, when the eABS control is being performed. In a situation where the present eABS control is started and continued, the eABS control state is maintained in the A state or the B state, whereby each of the in-wheel motors 15 to 18 is maintained in the regeneration state or the power running state. Accordingly, in a situation where the current eABS control is continued, the in-wheel motors 15 to 18 are not caused to repeatedly and alternately generate the motor braking torque Tmr and the motor driving torque Tmc through the regeneration control and the power running control. Therefore, time delay in control can be made very small, whereby satisfactory control performance can be attained. In addition, it is possible to suppress generation of noise and unnatural sensation imparted to the driver, which noise and natural sensation would otherwise be produced due to the reversal of the torque generated by each of the in-wheel motors 15 to 18.

In this case, the above-described embodiment may be modified to always set the value of the eABS control state flag State_eABS to the "B" value after the value of the eABS performance state flag f_eABS(n) is set to the "ON" value and the eABS control is performed. Hereinafter, this first modification will be described specifically.

Figure 12:
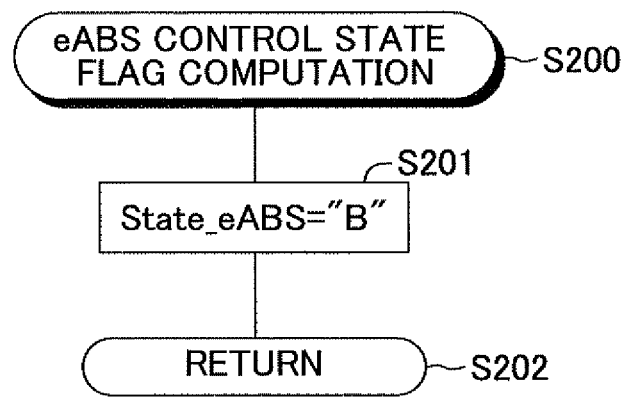
FIG. 12 is a flowchart relating to a first modification and showing the eABS control state flag computation routine.

In this first modification, the eABS control state flag computation routine shown in FIG. 5 and executed in the above-mentioned step S19 of the braking control program described in the above-described embodiment is changed to the eABS control state flag computation routine shown in FIG. 12. Specifically, the eABS control state flag computation routine according to this first modification is started in step S200. In step S201 subsequent thereto, the electronic control unit 26 sets the value of the eABS control state flag State_eABS to the "B" value. Subsequently, in step S202, the electronic control unit 26 returns to step S19 of the braking control program. That is, according to the eABS control state flag computation routine of the first modification, when the value of the eABS performance state flag f_eABS(n−1) is determined to be the "ON" value in the above-mentioned step S17 of the above-described braking control program and the value of the eABS performance state flag f_eABS(n) is maintained at the "ON" value in the above-mentioned step S18, the value of the eABS control state flag State_eABS is always maintained at the "B" value. With this operation, in a situation where the eABS control is performed, there is maintained the state in which the in-wheel motors 15 to 18 are operated in the state B; i.e., are caused to generate the motor driving torque Tmc through the power running control; and, when the eABS control is performed next time, there is also maintained the state in which the in-wheel motors 15 to 18 are operated in the state B; i.e., are caused to generate the motor driving torque Tmc through the power running control.

Accordingly, at the point when the eABS control is performed (started), the in-wheel motors 15 to 18 are brought into a waiting state in which the in-wheel motors 15 to 18 are ready to rotate in the direction for generation of the motor driving torque Tmc. Therefore, the influence of the backlash of the power transmission system can be eliminated at all times. The electronic control unit 26 does not repeatedly perform the regeneration control and the power running control for the in-wheel motors 15 to 18 so as to cause the in-wheel motors 15 to 18 to alternately generate the motor braking torque Tmr and the motor driving torque Tmc. Therefore, time delay in control can be made very small, whereby satisfactory control performance can be attained. In addition, it is possible to suppress generation of noise and unnatural sensation imparted to the driver, which noise and natural sensation would otherwise be produced due to the reversal of the torque generated by each of the in-wheel motors 15 to 18.

Figure 13:
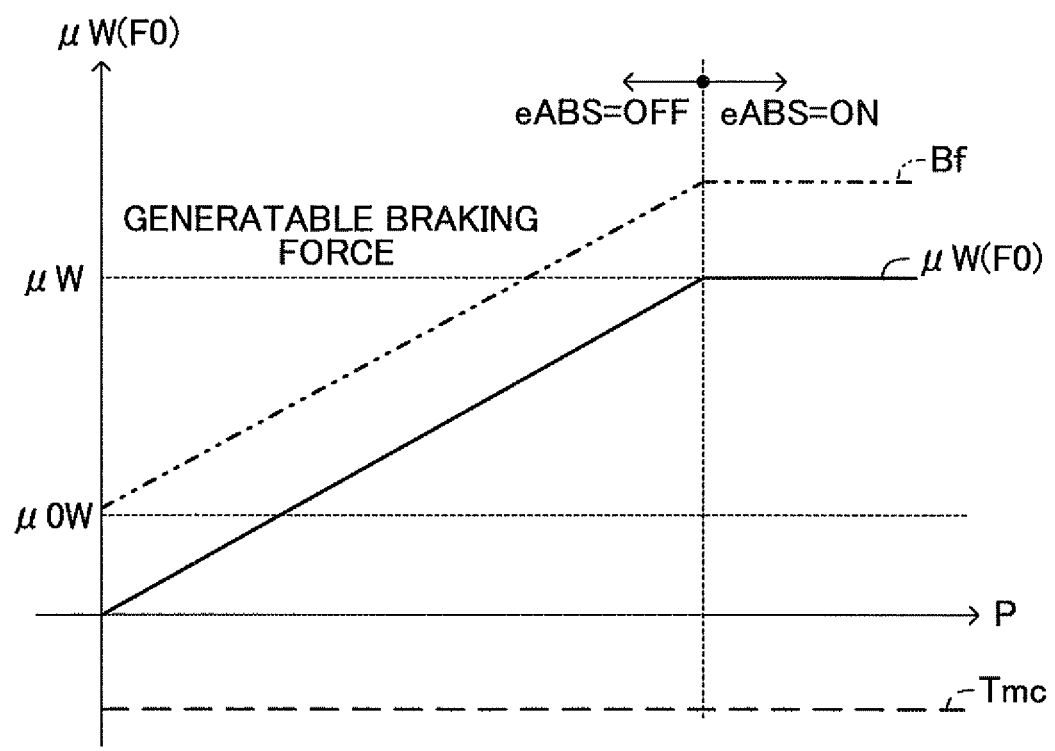
FIG. 13 is a chart relating to the first modification and showing the relation between depressing force and frictional braking force, motor braking torque, and motor driving torque.

Notably, in this first modification, in a situation where the road surface friction coefficient g is smaller than the friction coefficient μ0, as in the case shown in FIG. 6(b) of the above-described embodiment, the in-wheel motors 15 to 18 can apply the ideal braking force μW to the wheels 11 to 14, while coordinating with the friction brake mechanisms 21 to 24, in a state where the in-wheel motors 15 to 18 are caused to always generate the motor driving torque Tmc through the power running control performed by the electronic control unit 26. Meanwhile, in this first modification, when the vehicle Ve encounters a situation where the road surface friction coefficient μ is greater than the friction coefficient μ0, as shown in FIG. 13, the in-wheel motors 15 to 18 always generate the motor driving torque Tmc through the power running control, and the friction brake mechanisms 21 to 24 generate the necessary frictional braking force Bf in accordance with the above-described Eq. 4, in order to apply the ideal braking force μW to the wheels 11 to 14. Accordingly, even when the road surface friction coefficient g recovers, as in the above-described embodiment, the necessary braking force F0 for braking the vehicle Ve can be properly applied to the wheels 11 to 14.

b. Second Modification

In the above-described embodiment and first modification, in principle, the electronic control unit 26 sets the value of the eABS control state flag State_eABS to the "B" value so as to set the initial state of the eABS control to the B state, by executing the eABS control initial state flag computation routine shown in FIG. 7. In this case, the electronic control unit 26 can execute the eABS control initial state flag computation routine shown in FIG. 14 instead of or additionally to the eABS control initial state flag computation routine shown in FIG. 7.

Figure 14:
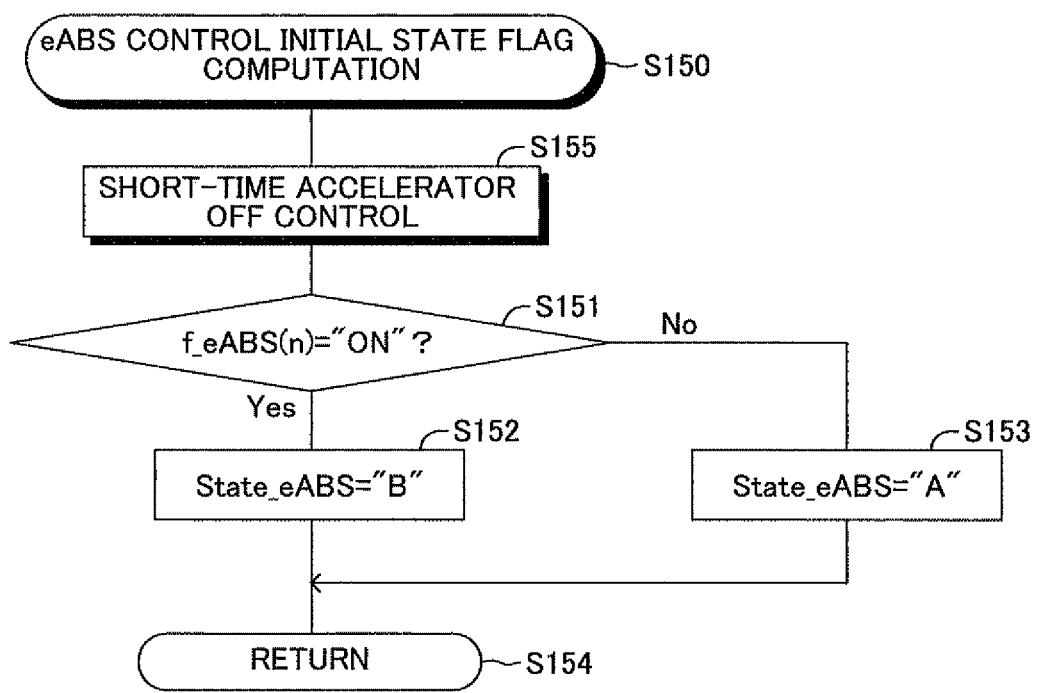
FIG. 14 is a flowchart relating to a second modification and showing the eABS control initial state flag computation routine.

Specifically, the control initial state flag computation routine shown in FIG. 14 is a routine for setting the value of the eABS control state flag State_eABS to the "B" value in order to set the initial state of the eABS control to the state B, so as to get ready for performing (starting) the eABS control, in the case where the driver stops accelerator operation (i.e., acceleration operation) within a short period of time, more specifically, in the case where the driver cancels the operation of the accelerator pedal within a short period of time.

Figure 15:
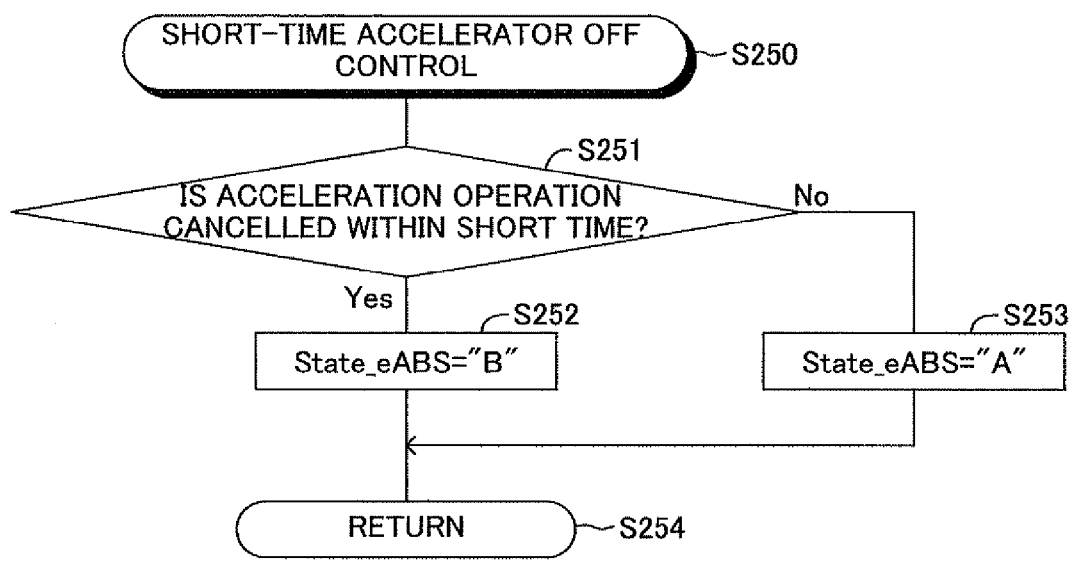
FIG. 15 is a flowchart showing a short-time accelerator off control subroutine of the eABS control initial state flag computation routine of FIG. 14.

That is, the eABS control initial state flag computation routine shown in FIG. 14 differs from the eABS control initial state flag computation routine shown in FIG. 7 in that step S155 is added. In step S155, the electronic control unit 26 executes a short-time accelerator off control subroutine. As shown in FIG. 15, this short-time accelerator off control subroutine is started in step S250. In step S251 subsequent thereto, the electronic control unit 26 determines whether or not the driver has cancelled the operation of the accelerator pedal (acceleration operation) within a short period of time. That is, the electronic control unit 26 acquires operation speed of the accelerator pedal from a sensor which is not shown in FIG. 1 and is adapted to detect the operation speed of the accelerator pedal. In the case where the operation of the accelerator pedal has been canceled within the short period of time, and operation of the brake pedal B (braking operation) has been started by, for example, the driver (through foot transfer from the accelerator pedal to the brake pedal), the electronic control unit 26 makes a "Yes" determination, and proceeds to step S252. Meanwhile, in the case where the operation of the accelerator pedal is not cancelled within the short period of time, the electronic control unit 26 makes a "No" determination, and proceeds to step S253.

In step S252, the electronic control unit 26 sets the value of the eABS control state flag State_eABS in the initial state to the value "B." With this operation, even in the case where the driver performs quick braking operation through foot transfer from the accelerator pedal to the brake pedal B, at the time when the eABS control is performed (started), the in-wheel motors 15 to 18 are brought into a waiting state in which the in-wheel motors 15 to 18 are ready to rotate in the direction for generation of the motor driving torque Tmc. Therefore, the influence of the backlash of the power transmission system can be eliminated at all times. Thus, time delay in control can be made very small, whereby satisfactory control performance can be attained. Notably, in this case, in response to the driver's cancellation of the operation of the accelerator pedal, the electronic control unit 26 operates the friction brake mechanisms 21 to 24 via the actuators 25, to thereby apply to the vehicle Ve a braking force corresponding to that generated through engine braking.

In step S253, the electronic control unit 26 sets the value of the eABS control state flag State_eABS in the initial state to the value "A." In this case, since the driver does not cancel the operation of the accelerator pedal within the short period of time, or the driver continues the operation of the accelerator pedal, the electronic control unit 26 causes the in-wheel motors 15 to 18 to generate the motor braking torque Tmr through the regeneration control when the operation of the accelerator pedal is cancelled.

Subsequently, the electronic control unit 26 ends the execution of the eABS control initial state flag computation routine in step S254, and returns to step S21 of the braking control program.

As described above, in the case of the second modification as well, as in the case of the above-described embodiment and first modification, at the point when the eABS control is performed (started), the in-wheel motors 15 to 18 are brought into a waiting state in which the in-wheel motors 15 to 18 are ready to rotate in the direction for generation of the motor driving torque Tmc. Therefore, the influence of the backlash of the power transmission system can be eliminated at all times. The electronic control unit 26 does not repeatedly perform the regeneration control and the power running control for the in-wheel motors 15 to 18 so as to cause the in-wheel motors 15 to 18 to alternately generate the motor braking torque Tmr and the motor driving torque Tmc. Therefore, time delay in control can be made very small, whereby satisfactory control performance can be attained. In addition, it is possible to suppress generation of noise and unnatural sensation imparted to the driver, which noise and natural sensation would otherwise be produced due to the reversal of the torque generated by each of the in-wheel motors 15 to 18. Moreover, in this second modification, even in the case where the accelerator pedal is again operated by the driver for acceleration operation, the in-wheel motors 15 to 18 are brought into a waiting state in which the in-wheel motors 15 to 18 are ready to rotate in the direction for generation of the motor driving torque Tmc. Therefore, it is possible to prevent noise, which would otherwise be generated by means of chattering occurring as a result of operation and release of the accelerator pedal.

c. Third Modification

In the above-described embodiment, first modification, and second modification, in principle, the electronic control unit 26 sets the value of the eABS control state flag State_eABS to the "B" value so as to set the initial state of the eABS control to the state B. In this case, the electronic control unit 26 can execute the ABS control initial state flag computation routine shown in FIG. 16 instead of or additionally to the eABS control initial state flag computation routine shown in FIG. 7 or FIG. 14.

Figure 16:
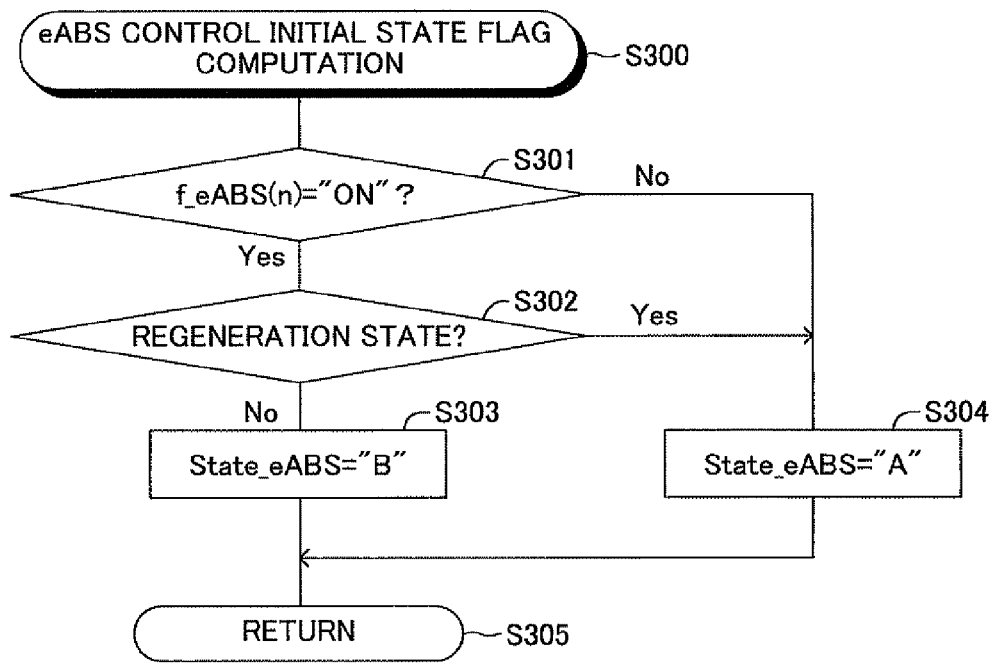
FIG. 16 is a flowchart relating to a third modification and showing the eABS control initial state flag computation routine.

Specifically, the control initial state flag computation routine shown in FIG. 16 is a routine for setting the value of the eABS control state flag State_eABS to the "A" value in order to set the initial state of the eABS control to the state A, only when each of the in-wheel motors 15 to 18 are in the regeneration state (the state A) before the eABS control is performed.

That is, the eABS control initial state flag computation routine shown in FIG. 16 is started in step S300. In step S301 subsequent thereto, the electronic control unit 26 determines whether or not the value of the eABS performance state flag f_eABS(n) is the "ON" value as in step S151 of the eABS control initial state flag computation routine shown FIG. 7. In the case where the value of the eABS performance state flag f_eABS(n) is the "ON" value, the electronic control unit 26 makes a "Yes" determination, and proceeds to step S302. Meanwhile, in the case where the value of the eABS performance state flag f_eABS(n) is the "OFF" value and the eABS control is not performed, the electronic control unit 26 makes a "No" determination, and proceeds to step S304. In S304, as in step S153 of the eABS control initial state flag computation routine shown in FIG. 7, the electronic control unit 26 sets the value of the eABS control state flag State_eABS in the initial state to the "A" value.

In step S302, the electronic control unit 26 determines wither or not each of the in-wheel motors 15 to 18 is in the regeneration state at the present. That is, the electronic control unit 26 determines wither or not each of the in-wheel motors 15 to 18 is in the regeneration state, on the basis of the signal input from the inverter 19 (for example, a signal representing electric energy or current supplied or regenerated during power running operation or regeneration operation of each of the in-wheel motors 15 to 18). That is, in the case where each of the in-wheel motors 15 to 18 is in the regeneration state, the electronic control unit 26 makes a "Yes" determination, and proceeds to step S304 so as to set the value of the eABS control state flag State_eABS in the initial state to the "A" value. Meanwhile, in the case where each of the in-wheel motors 15 to 18 is not in the regeneration state; in other words, each of the in-wheel motors 15 to 18 is in the power running state, the electronic control unit 26 makes a "No" determination, and proceeds to step S303.

In step S303, the electronic control unit 26 sets the value of the eABS control state flag State_eABS in the initial state to the "B" value, as in the case of step S152 of the eABS control initial state flag computation routine show in FIG. 7. Subsequently, the electronic control unit 26 ends the execution of the eABS control initial state flag computation routine in step S305, and returns to step S21 of the braking control program.

According, in this third modification, before and after the point when the eABS control is performed (started), the in-wheel motors 15 to 18 are brought into a state in which the in-wheel motors 15 to 18 are waiting in the state A for generating the motor braking torque Tmr. Therefore, the influence of the backlash of the power transmission system can be eliminated at all times. In the third modification as well, the electronic control unit 26 does not repeatedly perform the regeneration control and the power running control for the in-wheel motors 15 to 18 so as to cause the in-wheel motors 15 to 18 to alternately generate the motor braking torque Tmr and the motor driving torque Tmc. Therefore, time delay in control can be made very small, whereby satisfactory control performance can be attained. In addition, it is possible to suppress generation of noise and unnatural sensation imparted to the driver, which noise and natural sensation would otherwise be produced due to the reversal of the torque generated by each of the in-wheel motors 15 to 18. Moreover, in this third modification, in a situation in which the eABS control can be performed through the regeneration control of the in-wheel motors 15 to 18 in the state A, the state A can be continued. Therefore, the efficiency of electric power regeneration by the in-wheel motors 15 to 18 can be improved.

The present invention is not limited to the above-described embodiment, and can be changed in various manners without departing from the scope of the present invention.

For example, in the above-described embodiment and modifications 2, 3, when the eABS control state flag computation routine is executed in the above-mentioned step S19 of the braking control program, all the determination processings of the above-mentioned steps S103 to S105 of the routine are executed. The embodiment and modifications may be practiced to execute at least one determination processing among the determination processings of the above-mentioned steps S103 to S105. Even in the case where at least one determination processing among the determination processings of the above-mentioned steps S103 to S105 is performed, the value of the eABS control state flag State_eABS can be set to the "A" value or the "8" value.

In the above-described embodiment and modifications, the equation used for computing the frictional braking force Bf is switched from the above-mentioned Eq. 3 to the above-mentioned Eq. 4 when the magnitude of the estimated road surface friction coefficient $\mu$ becomes equal to the magnitude of the predetermined friction coefficient $\mu 0$; that is, when the frictional braking force Bf becomes approximately zero. The above-described embodiment and modifications may be practiced such that the equation used for computing the frictional braking force Bf is switched from the above-mentioned Eq. 3 to the above-mentioned Eq. 4 when the magnitude of the estimated road surface friction coefficient $\mu$ is greater than the magnitude of the predetermined friction coefficient $\mu 0$. In this case, hysteresis can be provided between a situation where the magnitude of the estimated road surface friction coefficient $\mu$ decreases and a situation where the magnitude of the estimated road surface friction coefficient $\mu$ increases. In addition, it is possible to absorb error produced when the magnitude of the road surface friction coefficient $\mu$ is estimated. Therefore, in accordance with the state of the road surface on which the vehicle Ve travels, rotations of the wheels 11 to 14 can be recovered reliably and more properly, and the vehicle can be braked properly.

Furthermore, in the case where the equation used for computing the frictional braking force Bf is switched from the above-mentioned Eq. 3 to the above-mentioned Eq. 4 when the magnitude of the estimated road surface friction coefficient $\mu$ is greater than the magnitude of the predetermined friction coefficient $\mu 0$, the frictional braking force Bf can be always calculated as a positive value. Thus, the friction brake mechanisms 21 to 24 can apply the frictional braking force Bf to the wheels 11 to 14. That is, since the frictional braking force Bf calculated by the above-mentioned Eq. 4, switched from the above-mentioned Eq. 3 immediately before the magnitude of the estimated road surface friction coefficient $\mu$ becomes equal to the magnitude of the predetermined friction coefficient $\mu 0$, does not become zero. Therefore, the friction brake mechanisms 21 to 24 can apply the frictional braking force Bf to the wheels 11 to 14. Thus, in the friction brake mechanisms 21 to 24, which are operated by oil pressure, the time required to increase or decrease the oil pressure can be shortened, and time delay at the time of increasing or decreasing the frictional braking force Bf can be prevented effectively, whereby the vehicle can be braked with satisfactory responsiveness.

In the above-described embodiment and modifications, the in-wheel motors 15 to 18 are provided in the respective wheels 11 to 14 of the vehicle Ve. However, the embodiment and modifications may be practiced such that the in-wheel motors 15, 16 are provided only in the left and right front wheels 11, 12 of the vehicle Ve or the in-wheel motors 17, 18 are provided only in the left and right rear wheels 13, 14 of the vehicle Ve. Even in the case where in-wheel motors are provided on the front wheel side or the rear wheel side only, effects similar to those of the above-described embodiment and modifications can be achieved by means of performing the regeneration control and the power running control as described above, to thereby cause the in-wheel motors to generate motor braking torque and motor driving torque.

In the above-described embodiment and modifications, the in-wheel motors 15 to 18 are provided in the respective wheels 11 to 14 of the vehicle Ve. However, the embodiment and modifications may be practiced such that electric motors (motors) are provided on the vehicle body side of the vehicle Ve so long as the motor braking torque Tmr and the motor driving torque Tmc can be applied to each of the wheels 11 to 14. Even in this case, effects similar to those of the above-described embodiment and modifications can be expected.

The invention claimed is:

1. A braking force control apparatus for a vehicle which comprises an electrical force generation mechanism which applies both electromagnetic driving force and electromagnetic braking force to a wheel of the vehicle; a braking force generation mechanism which applies mechanical braking force at least to the wheel which is rotated by the electromagnetic driving force generated by the electrical force generation mechanism; a brake operation unit which is operated by a driver in order to brake the vehicle; a braking control unit that controls, in accordance with the operation of the brake operation unit, the electromagnetic braking force or the electromagnetic driving force generated by the electrical force generation mechanism and the mechanical braking force generated by the braking force generation mechanism such that a braking force is applied to the wheel, the braking control unit comprises:

an electronic control unit that includes control logic, which when executed:

detects the state of a road surface on which the vehicle travels;

determines whether or not the wheel tends to lock on the basis of the state of the road surface detected;

determines a target braking force to be applied to the wheel, in accordance with the state of the road surface detected;

operates the electrical force generation mechanism in a power running state or a regeneration state to thereby generate an electromagnetic driving force of a predetermined magnitude or an electromagnetic braking force of a predetermined magnitude when the electronic control unit determines that the wheel tends to lock;

computes a mechanical braking force to be generated by the braking force generation mechanism, the mechanical braking force corresponding to a difference between the target braking force determined and the electromagnetic braking force or the electromagnetic driving force generated by the electrical force generation mechanism operated; and operates the braking force generation mechanism on the basis of the mechanical braking force computed, wherein:

the electronic control unit estimates a slip ratio of the wheel, and estimates a friction coefficient of the road surface on which the vehicle travels, on basis of the slip ratio estimated;

the electronic control unit determines whether or not the wheel tends to lock on the basis of the slip ratio estimated;

the electronic control unit determines the target braking force by calculating it by making use of the friction coefficient of the road surface estimated; and when the electronic control unit determines that the wheel tends to lock, the electronic control unit either, according to an operating condition, operates the electrical force generation mechanism in the power running state in accordance with the magnitude of the friction coefficient of the road surface estimated to thereby generate the electromagnetic driving force of the predetermined magnitude or operates the electrical force generation mechanism in the regeneration state in accordance with the magnitude of the friction coefficient of the road surface estimated to thereby generate the electromagnetic braking force of the predetermined magnitude.

2. The braking force control apparatus for a vehicle according to claim 1, wherein the electronic control unit:

operates the electrical force generation mechanism in the power running state to thereby generate the electromagnetic driving force of the predetermined magnitude when the magnitude of the friction coefficient of the road surface estimated is less than the magnitude of a predetermined friction coefficient; and operates the electrical force generation mechanism in the regeneration state to thereby generate the electromagnetic braking force of the predetermined magnitude when the magnitude of the friction coefficient of the road surface estimated is equal to or greater than the predetermined magnitude.

3. The braking force control apparatus for a vehicle according to claim 1, wherein the predetermined magnitude of the electromagnetic driving force generated by the electrical force generation mechanism operated in the power running state is less than a creep force required for creep traveling of the vehicle.

4. The braking force control apparatus for a vehicle according to claim 1, wherein the predetermined magnitude of the electromagnetic driving force which is generated by the electrical force generation mechanism operated in the power running state and which is applied to each rear wheel is greater than the predetermined magnitude of the electromagnetic driving force which is generated by the electrical force generation mechanism operated in the power running state and which is applied to each front wheel.

5. The braking force control apparatus for a vehicle according to claim 1, wherein the predetermined magnitude of the electromagnetic braking force which is generated by the electrical force generation mechanism operated in the regeneration state is less than a maximum braking force which can be generated by the electrical force generation mechanism in the regeneration state.

6. The braking force control apparatus for a vehicle according to claim 2, wherein the electronic control unit:

computes the mechanical braking force by adding the electromagnetic driving force of the predetermined magnitude to the target braking force determined, when the magnitude of the friction coefficient of the road surface estimated is less than the predetermined magnitude and operates the electrical force generation mechanism in the power running state to thereby generate the electromagnetic driving force of the predetermined magnitude; and computes the mechanical braking force by subtracting the electromagnetic braking force of the predetermined magnitude from the target braking force determined, when the magnitude of the friction coefficient of the road surface estimated is equal to or greater than the predetermined magnitude and operates the electrical force generation mechanism in the regeneration state to thereby generate the electromagnetic braking force of the predetermined magnitude.

7. The braking force control apparatus for a vehicle according to claim 2, wherein the magnitude of the predetermined friction coefficient is the magnitude of a friction coefficient at the time when the difference between the target braking force and the electromagnetic braking force of the predetermined magnitude becomes approximately zero, the target braking force being computed on the basis of the friction coefficient of the road surface estimated, and the electromagnetic braking force being generated by the electrical force generation mechanism operated in the regeneration state.

8. The braking force control apparatus for a vehicle according to claim 1, wherein the electrical force generation mechanism is provided for each of wheels of the vehicle; and the electronic control unit is configured such that, when at least one of the electrical force generation mechanisms provided for the wheels is operated in the power running state so as to generate the electromagnetic driving force of the predetermined magnitude, the electronic control unit operates another electrical force generation mechanism in the regeneration state so as to generate an electromagnetic braking force which cancels out the electromagnetic driving force of the predetermined magnitude generated by the electrical force generation mechanism operated in the power running state.

9. The braking force control apparatus for a vehicle according to claim 1, wherein the electronic control unit:

determines whether or not a driver has cancelled an acceleration operation of accelerating the vehicle by making use of at least the electromagnetic driving force generated by the electrical force generation mechanism, and when the electronic control unit determines that the acceleration operation has been cancelled, operates the electrical force generation mechanism in the power running state to thereby generate the electromagnetic driving force of the predetermined magnitude, and computes a mechanical braking force for producing a previously set deceleration in the vehicle.

10. The braking force control apparatus for a vehicle according to claim 1, wherein the electronic control unit is configured such that, when the electronic control unit determines that the wheel tends to lock and the electrical force generation mechanism in the power running state has operated, the electronic control unit continues the operation of the electrical force generation mechanism in the power running state until the operation of the brake operation unit by the driver is cancelled.

* * * * *